United States Patent
Itkowitz et al.

(10) Patent No.: US 12,521,194 B2
(45) Date of Patent: Jan. 13, 2026

(54) OPERATING MODE CONTROL SYSTEMS AND METHODS FOR A COMPUTER-ASSISTED SURGICAL SYSTEM

(71) Applicant: Intuitive Surgical Operations, Inc., Sunnyvale, CA (US)

(72) Inventors: Brandon D. Itkowitz, San Jose, CA (US); Heath Feather, Cupertino, CA (US); Alexandre V. Matveev, Santa Clara, CA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 938 days.

(21) Appl. No.: 17/612,165

(22) PCT Filed: May 27, 2020

(86) PCT No.: PCT/US2020/034736
§ 371 (c)(1),
(2) Date: Nov. 17, 2021

(87) PCT Pub. No.: WO2020/243192
PCT Pub. Date: Dec. 3, 2020

(65) Prior Publication Data
US 2022/0202515 A1 Jun. 30, 2022

Related U.S. Application Data

(60) Provisional application No. 62/854,124, filed on May 29, 2019.

(51) Int. Cl.
*A61B 34/35* (2016.01)
*A61B 34/00* (2016.01)
(Continued)

(52) U.S. Cl.
CPC .............. *A61B 34/35* (2016.02); *A61B 34/25* (2016.02); *A61B 90/03* (2016.02); *A61B 90/37* (2016.02);
(Continued)

(58) Field of Classification Search
CPC ......... A61B 34/37; A61B 90/03; A61B 90/37; A61B 2017/00199; A61B 2017/00216;
(Continued)

(56) References Cited

U.S. PATENT DOCUMENTS 8,681,095 B2 * 3/2014 Ogawa ............... A61B 1/00042
600/103
10,251,713 B2 4/2019 Ruiz Morales et al.
(Continued)

FOREIGN PATENT DOCUMENTS

CN 105407791 A 3/2016
CN 107249497 A 10/2017
(Continued)

OTHER PUBLICATIONS

Extended European Search Report for Application No. EP23213713.3, mailed on Mar. 15, 2024, 06 pages.
(Continued)

*Primary Examiner* — Abby Lin
*Assistant Examiner* — Karston G. Evans

(57) ABSTRACT

An exemplary system may access head presence data and eye tracking data. The head presence data indicates a presence or an absence of a head of a user within a vicinity of a viewer console. The eye tracking data indicates whether an eye of a user is gazing at a display device. If the head presence data indicates that the head of the user is present and the eye tracking data indicates that the eye of the user is gazing at the display device, the system directs the user control system to operate in a first operating mode. If the
(Continued)

head presence data indicates that the head of the user is present and the eye tracking data indicates that the eye of the user is not gazing at the display device, the system directs the user control system to operate in a second operating mode different from the first operating mode.

20 Claims, 21 Drawing Sheets

(51) Int. Cl.
    *A61B 90/00*     (2016.01)
    *G06F 3/01*     (2006.01)
    *A61B 17/00*     (2006.01)
    *A61B 34/20*     (2016.01)
    *G02B 27/00*     (2006.01)

(52) U.S. Cl.
    CPC .............. *G06F 3/012* (2013.01); *G06F 3/013* (2013.01); *A61B 2017/00199* (2013.01); *A61B 2017/00216* (2013.01); *A61B 2034/2065* (2016.02); *G02B 27/0093* (2013.01)

(58) Field of Classification Search
    CPC ...... A61B 2034/2065; A61B 2090/061; A61B 2090/371; A61B 34/25; A61B 34/35; A61B 34/70; G02B 27/0093; G02B 23/2423; G02B 2027/0134; G02B 2027/0138; G06F 3/012; G06F 3/013; G06F 3/0346; G06F 21/32; G16H 20/40; G16H 40/67; G16H 50/20
    See application file for complete search history.

(56) References Cited

U.S. PATENT DOCUMENTS

| | | | | |
|---|---|---|---|---|
| 2003/0060927 | A1* | 3/2003 | Gerbi | .................... A61B 34/71 606/130 |
| 2006/0100642 | A1 | 5/2006 | Yang et al. | |
| 2011/0234484 | A1* | 9/2011 | Ogawa | ............... A61B 1/00042 345/204 |
| 2015/0335479 | A1 | 11/2015 | Shibata et al. | |
| 2017/0172675 | A1 | 6/2017 | Jarc et al. | |
| 2018/0078319 | A1 | 3/2018 | Nobles et al. | |
| 2018/0310997 | A1* | 11/2018 | Peine | ..................... A61B 34/37 |
| 2020/0015917 | A1* | 1/2020 | Cavalier | ................ B25J 9/1689 |
| 2020/0289223 | A1* | 9/2020 | Denlinger | .............. A61B 34/77 |
| 2020/0352663 | A1* | 11/2020 | Klingbeil | ............... G16H 20/40 |
| 2020/0360096 | A1* | 11/2020 | Savall | .................... A61B 34/30 |
| 2020/0363868 | A1* | 11/2020 | Freiin von Kapri | ... A61B 34/30 |
| 2021/0335483 | A1* | 10/2021 | Freeman | ................ G16H 50/20 |
| 2021/0393331 | A1* | 12/2021 | Hufford | ............... A61B 1/0661 |
| 2022/0054207 | A1* | 2/2022 | Xu | .......................... A61B 34/37 |
| 2022/0257326 | A1* | 8/2022 | Gao | ....................... A61B 34/37 |

FOREIGN PATENT DOCUMENTS

| JP | 2008221363 A | * | 9/2008 |
| WO | WO-2015143067 A1 | | 9/2015 |
| WO | WO-2018165047 A1 | | 9/2018 |

OTHER PUBLICATIONS

International Search Report and Written Opinion for Application No. PCT/US2020/034736, mailed Oct. 19, 2020, 11 pages.

Vertut, J, and Coiffet, P., "Robot Technology: Teleoperation and Robotics Evolution and Development," English translation, Prentice-Hall, Inc., Inglewood Cliffs, NJ, USA 1986, vol. 3A, 332 pages.

Office Action for Chinese Application No. CN202080047496, mailed Apr. 11, 2024, 24 pages.

International Preliminary Report on Patentability for Application No. PCT/US2020/034736 mailed on Dec. 9, 2021, 8 pages.

Office Action for Chinese Application No. CN202080047496, mailed Nov. 27, 2024, 31 pages.

\* cited by examiner

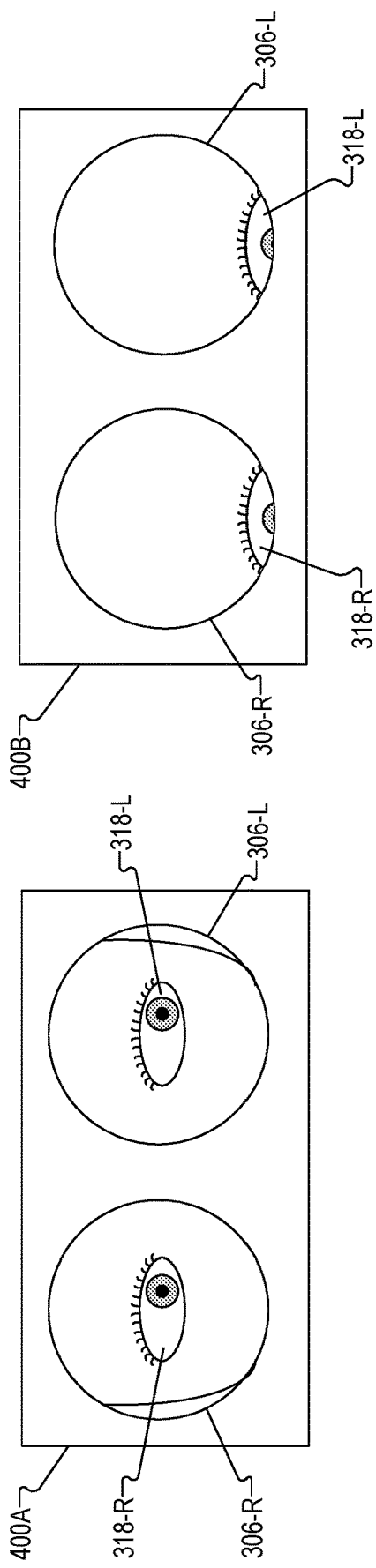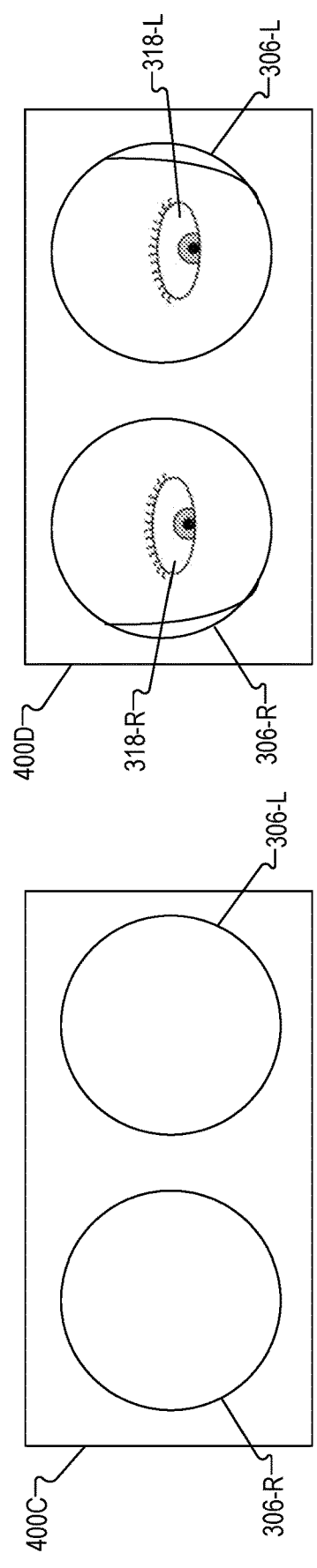

OPERATING MODE CONTROL SYSTEMS AND METHODS FOR A COMPUTER-ASSISTED SURGICAL SYSTEM

RELATED APPLICATIONS

The present application is a U.S. National Stage Application under 35 U.S.C. § 371 of International Application No. PCT/US2020/034736, filed on May 27, 2020, which claims priority to U.S. Provisional Patent Application No. 62/854,124, filed on May 29, 2019, the contents of which are hereby incorporated by reference in their entirety.

BACKGROUND INFORMATION

During a computer-assisted surgical procedure, a surgeon may manipulate master controls of a user control system to control teleoperated surgical instruments to perform the surgical procedure on a patient. In a minimally invasive surgical procedure that uses a computer-assisted surgical system, an imaging device (e.g., an endoscope) may capture imagery of a surgical area associated with the patient, and the user control system may present the captured imagery to the surgeon to provide a visualization of the surgical area. The surgeon may view the imagery of the surgical area in performing the surgical procedure.

A conventional computer-assisted surgical system may detect when a head of a user (e.g., a surgeon) is located within a vicinity of a viewer console included in the user control system (e.g., by sensing whether a series of transverse infrared beams are blocked in front of eyepieces of the viewer console). Based on this detection, the computer-assisted surgical system may set an appropriate operating mode for the user control system. For example, the computer-assisted surgical system may only allow control of the teleoperated surgical instruments when the user's head is located within the vicinity of the viewer console. This may prevent unintentional and therefore uncontrolled movement of the teleoperated surgical instruments. However, there remains room to improve selection and control of an operating mode of the user control system.

SUMMARY

An exemplary system may comprise a memory storing instructions and a processor communicatively coupled to the memory and configured to execute the instructions to access head presence data generated by a head sensor included in a user control system of a computer-assisted surgical system, the head presence data indicating a presence or an absence of a head of a user within a vicinity of a viewer console included in the user control system; access eye tracking data generated by an eye sensor included in the user control system, the eye tracking data indicating whether an eye of the user is gazing through an eyepiece included in the user control system; direct, if the head presence data indicates that the head of the user is present within the vicinity of the viewer console and the eye tracking data indicates that the eye of the user is gazing through the eyepiece, the user control system to operate in a first operating mode; and direct, if the head presence data indicates that the head of the user is present within the vicinity of the viewer console and the eye tracking data indicates that the eye of the user is not gazing through the eyepiece, the user control system to operate in a second operating mode different from the first operating mode.

An exemplary system may comprise a head sensor configured to detect a presence or an absence of a head of a user within a vicinity of a viewer console included in a user control system of a computer-assisted surgical system and generate head presence data indicating the presence or the absence of the head of the user within the vicinity of the viewer console; an eye sensor configured to detect whether an eye of the user is gazing through an eyepiece included in the user control system and generate eye tracking data indicating whether the eye of the user is gazing through the eyepiece; and a processor communicatively coupled to the memory and configured to execute instructions to access the head presence data and the eye tracking data; direct, if the head presence data indicates that the head of the user is present within the vicinity of the viewer console and the eye tracking data indicates that the eye of the user is gazing through the eyepiece, the user control system to operate in a first operating mode; and direct, if the head presence data indicates that the head of the user is present within the vicinity of the viewer console and the eye tracking data indicates that the eye of the user is not gazing through the eyepiece, the user control system to operate in a second operating mode different from the first operating mode.

An exemplary method may comprise accessing head presence data generated by a head sensor included in a user control system of a computer-assisted surgical system, the head presence data indicating a presence or an absence of a head of a user within a vicinity of a viewer console included in the user control system; accessing eye tracking data generated by an eye sensor included in the user control system, the eye tracking data indicating whether an eye of the user is gazing through an eyepiece included in the user control system; directing, if the head presence data indicates that the head of the user is present within the vicinity of the viewer console and the eye tracking data indicates that the eye of the user is gazing through the eyepiece; the user control system to operate in a first operating mode; and directing; if the head presence data indicates that the head of the user is present within the vicinity of the viewer console and the eye tracking data indicates that the eye of the user is not gazing through the eyepiece; the user control system to operate in a second operating mode different from the first operating mode.

An exemplary system may comprise a memory storing instructions and a processor communicatively coupled to the memory and configured to execute the instructions to access, over time during a surgical session; head presence data indicating a presence or an absence of a head of a user within a vicinity of a viewer console included in a user control system of a computer-assisted surgical system; access, over time during the surgical session, eye tracking data indicating whether an eye of a user is gazing through an eyepiece included in the user control system; access; over time during the surgical session, hand presence data indicating a presence or an absence of a hand of the user within a vicinity of a master control included in the user control system; determine, based on a combination of the head presence data, the eye tracking data, and the hand presence data, an intent of the user to interact with the user control system; and direct the user control system to facilitate user interaction, during the surgical session, in accordance with determined intent of the user.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIGS. 4A-4D illustrate exemplary eye sensor images according to principles described herein.

DETAILED DESCRIPTION

Figure 1:
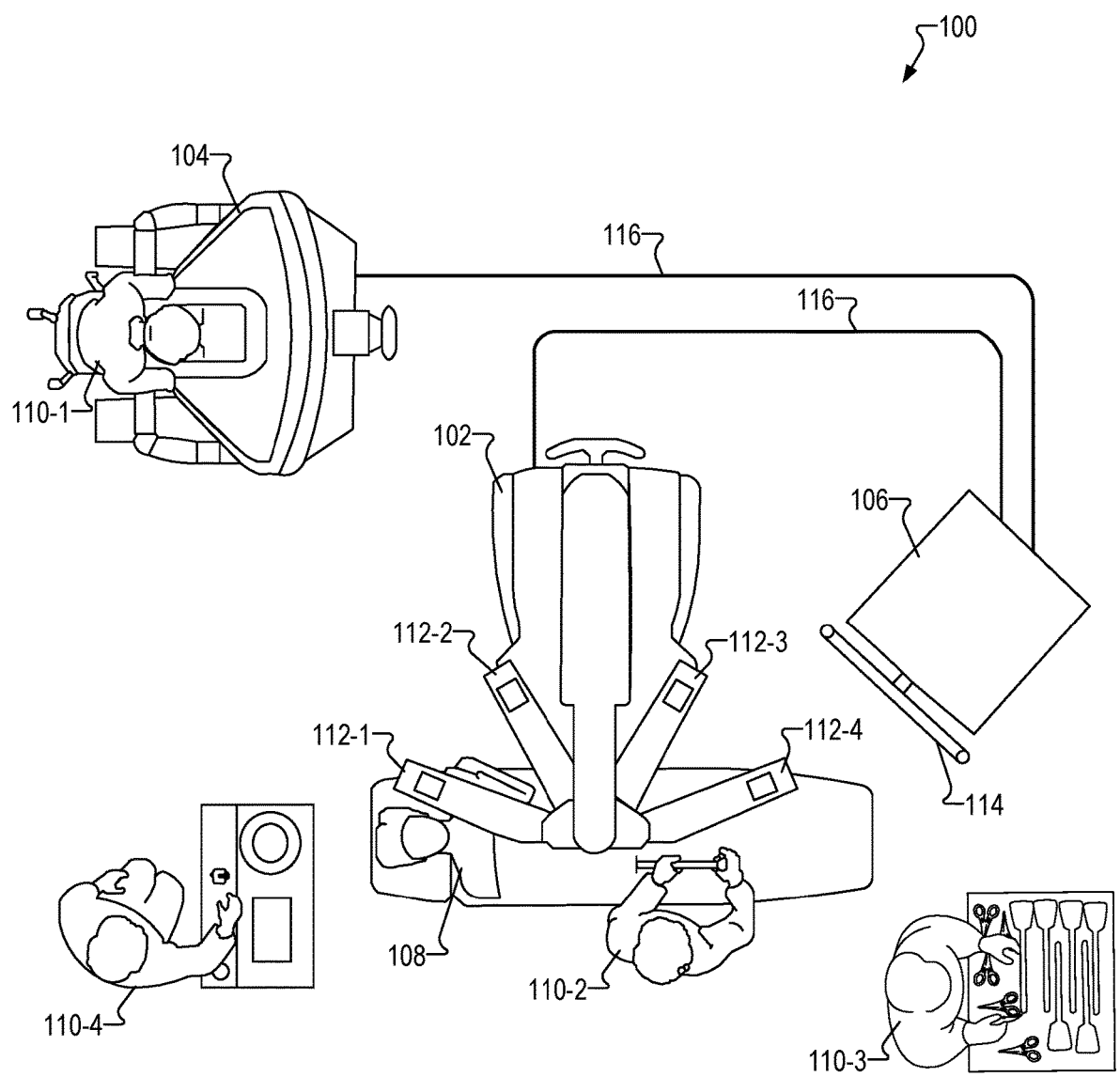
FIG. 1 illustrates an exemplary computer-assisted surgical system according to principles described herein.

Exemplary operating mode control systems and methods are described herein. An exemplary operating mode control system may access head presence data generated by a head sensor included in a user control system of a computer-assisted surgical system and access eye tracking data generated by an eye sensor included in the user control system. The head presence data may indicate a presence or an absence of a head of a user within a vicinity of a viewer console included in the user control system. The eye tracking data may indicate whether an eye of the user is gazing through an eyepiece included in the user control system. If the head presence data indicates that the head of the user is present within the vicinity of the viewer console and the eye tracking data indicates that the eye of the user is gazing through the eyepiece, the operating mode control system may direct the user control system to operate in a first operating mode. If the head presence data indicates that the head of the user is present within the vicinity of the viewer console and the eye tracking data indicates that the eye of the user is not gazing through the eyepiece, the operating mode control system may direct the user control system to operate in a second operating mode different from the first operating mode.

To illustrate, while a surgeon is positioned at a user control system and is viewing, through a set of eyepieces of the user control system, stereoscopic imagery of a surgical area associated with a patient as generated by a stereoscopic endoscope, the head presence data may indicate that a head of the surgeon is within a vicinity of a viewer console included in the user control system and the eye tracking data may indicate that the eyes of the surgeon are gazing through the eyepieces. The operating mode control system may accordingly direct the user control system to operate in an active operating mode. In the active operating mode the surgeon may manipulate a set of master controls to teleoperate surgical instruments (e.g., to perform a minimally-invasive surgical procedure).

With his or her head still positioned at the user control system, the surgeon may look down and away from the stereoscopic imagery (e.g., at one or more foot pedals or other input devices on the user control system and/or or at his or her hands). In this case, the eye tracking data may indicate that the user's eyes are not gazing through the eyepieces (e.g., that the surgeon is not looking at the stereoscopic imagery). In response, the operating mode control system may direct the user control system to switch to operate in a suspended operating mode. In the suspended operating mode the surgical instruments cannot be controlled by way of the master controls. To regain control of the surgical instruments, the surgeon may return to looking at the stereoscopic imagery by gazing through the eyepieces. In response, the operating mode control system may direct the user control system to switch back to operating in the active operating mode.

Various benefits may be provided by the operating mode control systems and methods described herein. For example, the operating mode control systems and methods described herein combine head proximity sensing with eye sensing in order to distinguish between the intent of a user to interact with imagery generated by a computer-assisted surgical system and the intent of the user to interact with an environment outside of the viewer console. The operating mode control systems and methods may automatically infer the intent of a user and set an operating mode thereof accordingly. Moreover, the operating mode control systems and methods described herein may enable and adjust features of the user control system based on a state of a user's interaction with the user control system. As a result, the user control system may implement safety features while at the same time enabling additional features that may be useful to a surgeon while performing a surgical procedure.

Various embodiments will now be described in more detail with reference to the figures. The systems and methods described herein may provide one or more of the benefits mentioned above and/or various additional and/or alternative benefits that will be made apparent herein.

The operating mode control systems and methods described herein may be implemented as part of or in conjunction with a computer-assisted surgical system. As such, an exemplary computer-assisted surgical system will now be described. The following exemplary computer-assisted surgical system is illustrative and not limiting, as the operating mode control systems and methods described herein may be implemented as part of or in conjunction with other suitable surgical systems.

FIG. 1 illustrates an exemplary computer-assisted surgical system 100 ("surgical system 100"). As shown, surgical system 100 may include a manipulating system 102, a user control system 104, and an auxiliary system 106 communicatively coupled one to another. In some examples, surgical system 100 may be implemented by one or more of these components.

Surgical system 100 may be utilized by a surgical team to perform a computer-assisted surgical procedure on a patient 108. As shown, the surgical team may include a surgeon 110-1, an assistant 110-2, a nurse 110-3, and an anesthesiologist 110-4, all of whom may be collectively referred to as "surgical team members 110." Additional or alternative surgical team members may be present during a surgical session as may serve a particular implementation.

While FIG. 1 illustrates an ongoing minimally invasive surgical procedure, surgical system 100 may similarly be used to perform open surgical procedures or other types of surgical procedures that may similarly benefit from the accuracy and convenience of surgical system 100. Additionally, it will be understood that the surgical session throughout which surgical system 100 may be employed may not only include an operative phase of a surgical procedure, as is illustrated in FIG. 1, but may also include preoperative, postoperative, and/or other suitable phases of the surgical procedure. A surgical procedure may include any procedure in which manual and/or instrumental techniques are used on a patient to investigate; diagnose, or treat a physical condition of the patient. Additionally, a surgical procedure may include any procedure that is not performed on a live patient, such as a calibration procedure, a training procedure, and an experimental or research procedure.

As shown in FIG. 1, manipulating system 102 may include a plurality of manipulator arms 112 (e.g., manipulator arm 112-1 through 112-4) to which a plurality of surgical instruments (not shown) may be coupled. Each surgical instrument may be implemented by any suitable surgical tool (e.g., a tool having tissue-interaction functions), medical tool, monitoring instrument (e.g., an endoscope), sensing instrument (e.g., a force-sensing surgical instrument); diagnostic instrument, or the like that may be used for a computer-assisted surgical procedure (e.g., by being at least partially inserted into patient 108 and manipulated to perform a computer-assisted surgical procedure on patient 108). While manipulating system 102 is depicted and described herein as including four manipulator arms 112, it will be recognized that manipulating system 102 may include only a single manipulator arm 112 or any other number of manipulator arms as may serve a particular implementation.

Manipulator arms 112 and/or surgical instruments attached to manipulator arms 112 may include one or more displacement transducers, orientational sensors, and/or positional sensors used to generate raw (i.e., uncorrected) kinematics information (hereinafter "surgical system sensors"). One or more components of surgical system 100 may be configured to use the kinematics information to track (e.g., determine positions of) and/or control the surgical instruments.

Surgical instruments attached to manipulator arms 112 may each be positioned at a surgical area associated with a patient. A "surgical area" may, in certain examples, be entirely disposed within a patient and may include an area within the patient at or near where a surgical procedure is planned to be performed, is being performed, or has been performed. For example, for a minimally invasive surgical procedure being performed on tissue internal to a patient, the surgical area may include the tissue, anatomy underlying the tissue, as well as space around the tissue where, for example, surgical instruments being used to perform the surgical procedure are located. In other examples, a surgical area may be at least partially disposed external to the patient at or near where a surgical procedure is planned to be performed, is being performed, or has been performed on the patient. For instance, surgical system 100 may be used to perform an open surgical procedure such that part of the surgical area (e.g., tissue being operated on) is internal to the patient while another part of the surgical area (e.g., a space around the tissue where one or more surgical instruments may be disposed) is external to the patient. A surgical instrument may be referred to as being positioned or located at or within a surgical area when at least a portion of the surgical instrument (e.g., a distal portion of the surgical instrument) is located within the surgical area.

User control system 104 may be configured to facilitate control by surgeon 110-1 of manipulator arms 112 and surgical instruments attached to manipulator arms 112. For example, surgeon 110-1 may interact with user control system 104 to remotely move or manipulate manipulator arms 112 and the surgical instruments coupled to manipulator arms 112. To this end, user control system 104 may provide surgeon 110-1 with imagery (e.g., high-definition stereoscopic imagery) of a surgical area associated with patient 108 as captured by an imaging device (e.g., a stereoscopic endoscope). Surgeon 110-1 may utilize the imagery to perform one or more procedures with one or more surgical instruments coupled to manipulator arms 112.

To facilitate control of surgical instruments, user control system 104 may include a set of master controls (not shown). These master controls may be manipulated by surgeon 110-1 to control movement of surgical instruments (e.g., by utilizing robotic and/or teleoperation technology). The master controls may be configured to detect a wide variety of hand, wrist, and finger movements by surgeon 110-1. In this manner, surgeon 110-1 may intuitively perform a surgical procedure using one or more surgical instruments.

User control system 104 may further be configured to facilitate control by surgeon 110-1 of other components of surgical system 100. For example, surgeon 110-1 may interact with user control system 104 to change a configuration or operating mode of surgical system 100, to change a display mode of surgical system 100, to generate additional control signals used to control surgical instruments attached to manipulator arms 112, to facilitate switching control from one surgical instrument to another, or to perform any other suitable operation. To this end, user control system 104 may also include one or more input devices (e.g., foot pedals, buttons, switches, etc.) configured to receive input from surgeon 110-1.

Auxiliary system 106 may include one or more computing devices configured to perform primary processing operations of surgical system 100. The one or more computing devices included in auxiliary system 106 may control and/or coordinate operations performed by various other components (e.g., manipulating system 102 and/or user control system 104) of surgical system 100. For example, a computing device included in user control system 104 may transmit instructions to manipulating system 102 by way of the one or more computing devices included in auxiliary system 106. As another example, auxiliary system 106 may receive, from manipulating system 102 (e.g., from an imaging device), and process image data representative of imagery captured by an endoscope attached to a manipulator arm 112.

In some examples, auxiliary system 106 may be configured to present visual content to surgical team members 110 who may not have access to the imagery provided to surgeon 110-1 at user control system 104. To this end, auxiliary system 106 may include a display monitor 114 configured to display one or more user interfaces, such as images (e.g., 2D images) of the surgical area, information associated with patient 108 and/or the surgical procedure, and/or any other visual content as may serve a particular implementation. For example, display monitor 114 may display images of the surgical area together with additional content (e.g., graphical content, contextual information, etc.) concurrently displayed with the images. In some embodiments, display monitor 114 is implemented by a touchscreen display with which surgical team members 110 may interact (e.g., by way of touch gestures) to provide user input to surgical system 100.

While auxiliary system 106 is shown in FIG. 1 as a separate system from manipulating system 102 and user control system 104, auxiliary system 106 may be included in, or may be distributed across, manipulating system 102 and/or user control system 104.

Manipulating system 102, user control system 104, and auxiliary system 106 may be communicatively coupled one to another in any suitable manner. For example, as shown in FIG. 1, manipulating system 102, user control system 104, and auxiliary system 106 may be communicatively coupled by way of control lines 116, which may represent any wired or wireless communication link as may serve a particular implementation. To this end, manipulating system 102, user control system 104, and auxiliary system 106 may each include one or more wired or wireless communication interfaces, such as one or more local area network interfaces, Wi-Fi network interfaces, cellular interfaces, etc.

Figure 2:
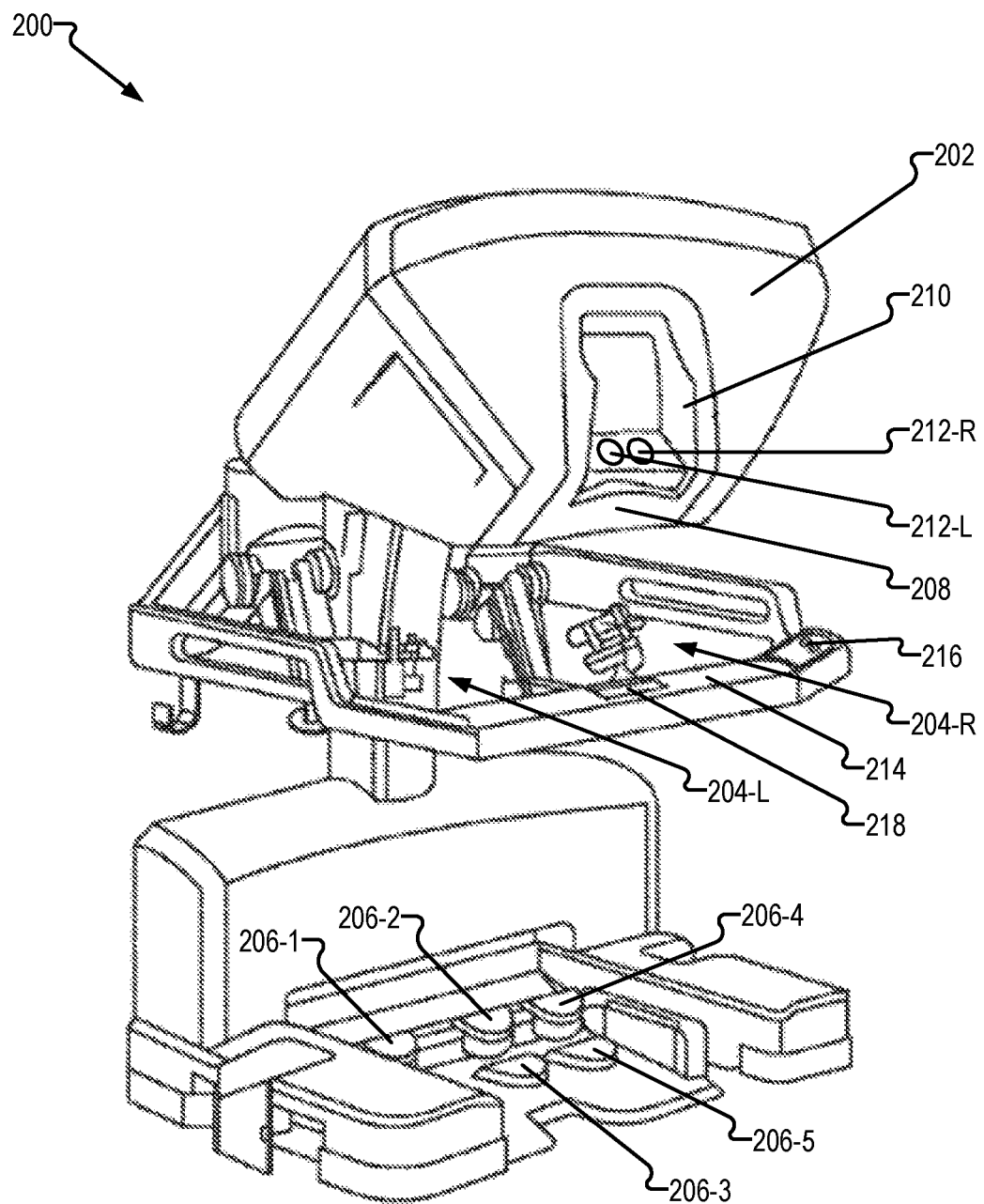
FIG. 2 illustrates an exemplary user control system of the computer-assisted surgical system of FIG. 1 according to principles described herein.

FIG. 2 illustrates an exemplary user control system 200 that may be used in accordance with the systems and methods described herein to facilitate control of various operations of a computer-assisted surgical system (e.g., surgical system 100). In some examples, user control system 200 implements user control system 104.

As shown, user control system 200 includes a display module 202, a set of master controls 204 (e.g., master control 204-L and master control 204-R), and a set of foot pedals 206 (e.g., foot pedals 206-1 through 206-5). User control system 200 may include additional or alternative components as may serve a particular implementation. For example, user control system 200 may include various computing components (e.g., processors, memory, etc.), support structures (e.g., a base, a column, etc.), adjustment mechanisms (e.g., pivots, motors, etc.), and the like.

As shown, display module 202 includes an image display system 208, a viewer console 210, and eyepieces 212 (e.g., eyepiece 212-L and eyepiece 212-R). Display module 202 may also include one or more head sensors (not shown in FIG. 2) configured to detect a presence of a head of a user within a vicinity of viewer console 210, and one or more eye sensors (not shown in FIG. 2) configured to track an eye of the user (e.g., detect a presence of the user's eye within a viewing range of an eyepiece 212 and/or detect a gaze direction of the user's eye).

Figure 3:
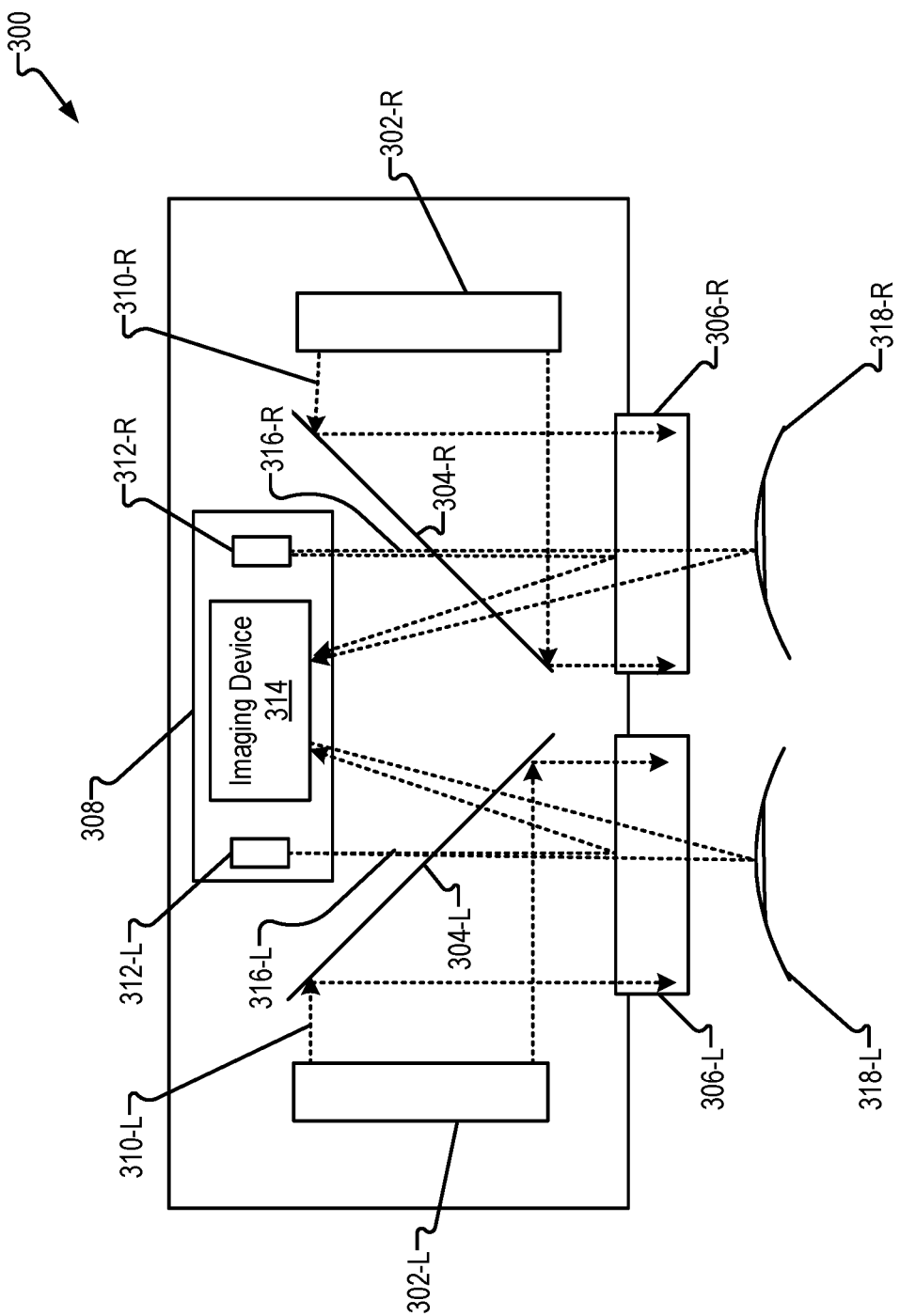
FIG. 3 illustrates an exemplary image presentation system that may be included in the user control system of FIG. 2 according to principles described herein.

Image display system 208 is configured to present imagery generated by a surgical system (e.g., surgical system 100), such as imagery of a surgical area associated with a patient (e.g., patient 108). FIG. 3 shows an exemplary image display system 300 that may be included in display module 202 to provide a user with stereoscopic imagery of a surgical area associated with a patient as generated by a stereoscopic endoscope. As shown in FIG. 3, image display system 300 includes display devices 302 (e.g., left display device 302-L and right display device 302-R), mirrors 304 (e.g., left mirror 304-L and right mirror 304-R), eyepieces 306 (e.g., left eyepiece 306-L and right eyepiece 306-R), and eye sensor 308, Image display system 300 may also include additional or alternative components, such as one or more optics (e.g., lenses, filters, polarizers, light guides, etc.), as may suit a particular implementation.

Display devices 302 may display imagery generated by surgical system 100, such as imagery of a surgical area associated with a patient. In some examples, display devices 302 may also display supplemental visual content concurrently with the imagery of the surgical area associated with the patient. Such supplemental visual content may include, for example, other medical imagery (e.g., imagery generated by ultrasound imaging, computed tomography (CT), optical coherence tomography (OCT), magnetic resonance imaging (MRI), and the like), contextual information about surgical system 100 and/or the surgical procedure, patient information, and the like. Imagery of the surgical area associated with the patient may be presented in a main area of display devices 302, and the supplemental visual content may be displayed, for example, in a peripheral area of display devices 302.

Display devices 302 may be implemented by any suitable display devices configured to emit visible light representative of imagery generated by surgical system 100 and/or supplemental visual content. For example, display devices 302 may be implemented by a liquid crystal display (LCD), a light emitting diode (LED) display, an organic LED display, a digital micromirror display (DMD), and the like. Display device 302-L emits visible light 310-L representative of a left image toward mirror 304-L, and display device 302-R emits visible light 310-R representative of a right image toward mirror 304-R, Mirror 304-L and mirror 304-R reflect visible light 310-L and visible light 310-R, respectively, toward eyepiece 306-L and eyepiece 306-R.

Eyepieces 306 are configured to enable a user to view the imagery presented by display devices 302. Eyepieces 306 receive visible light 310 from mirrors 304 and direct visible light 310 to distal ends of eyepieces 306, When a user is gazing into eyepieces 306, the user may view the imagery presented by display devices 302. Each eyepiece 306 may include a housing (e.g., a lens barrel) and one or more optics (e.g., lenses, filters, polarizers, light guides, etc.) within the housing as may suit a particular implementation. In some examples, image display system 208 may include an interpupillary adjustment mechanism configured to adjust an interpupillary distance between eyepiece 306-L and eyepiece 306-R. In this way, eyepieces 306 may be adjusted to fit the shape and size of the user's face. The interpupillary adjustment mechanism may be implemented by any suitable mechanism(s).

Eye sensor 308 is configured to track a user's eye (e.g., detect a presence of a user's eye within a viewing range of an eyepiece 306 and/or detect a gaze direction of the user's eye). Eye sensor 308 may track the user's eye in any suitable manner and using any suitable eye detection and/or gaze tracking technologies, including but not limited to iris detection, pupil detection, pupil and glint detection, and the like.

For example, as shown in FIG. 3, eye sensor 308 may include non-visible light sources 312 (e.g., non-visible light source 312-L and non-visible light source 312-R) and an imaging device 314. Eye sensor 308 may also include or be implemented by any additional or alternative components as may suit a particular implementation, such as an image processing facility, a memory, a computing device (e.g., a computing device included in auxiliary system 106), and the like. Non-visible light sources 312 may be configured to emit non-visible light 316 (e.g., non-visible light 316-L and non-visible light 316-R), such as infrared (IR) light, toward mirrors 304. Non-visible light 316 passes through mirrors 304 toward eyepieces 306. As mentioned, mirrors 304 are configured to reflect visible light 310 from display devices 302 toward eyepieces 306 and transmit non-visible light 316 from eye sensor 308 toward eyepieces 306. Mirrors 304 may be implemented by any suitable mirror.

Eyepieces 306 receive non-visible light 316 and direct non-visible light 316 to the distal ends of eyepieces 306, If a user is positioned in front of eyepieces 306, non-visible light 316 may be reflected by the user's head or by the user's eyes 318 (e.g., left eye 318-L and/or right eye 318-R) toward imaging device 314. Imaging device 314 is configured to detect non-visible light 316 reflected by the user. Imaging device 314 may be implemented by any suitable type of camera or other type of image capture device capable of capturing non-visible light 316. In some examples, imaging device 314 may include an IR filter configured to transmit only the narrow range of non-visible light 316 emitted by non-visible light sources 312.

An eye sensor image may be generated (e.g., by imaging device 314 or another computing device communicatively coupled to imaging device 314) based on the non-visible light captured by imaging device 314. The eye sensor image may be used to generate eye tracking data, which indicates either that an eye of the user is gazing through an eyepiece 306 or that an eye of the user is not gazing through an eyepiece 306. As will be explained below in more detail, eye tracking data may be used to determine and set an operating mode in which user control system 200 is to operate.

In some examples, eye tracking data is generated based on tracking (e.g., detecting) a presence or absence of an eye of a user within a viewing range of an eyepiece 306. The viewing range of an eyepiece 306 is a region in front of an eyepiece 306 from which the user's eye 318 may view, via the eyepiece 306, the imagery presented by display devices 302. Eye 318 is determined to be present within the viewing range of an eyepiece 306 if, in the eye sensor image, eye 318 (e.g., the pupil) is detected within the eyepiece 306. If eye 318 is determined to be present, then it is inferred that eye 318 is gazing through eyepiece 306 to view imagery presented by display device 302. In such case, the eye tracking data indicates that an eye of a user is gazing through an eyepiece. On the other hand, an eye is determined to be absent from within the viewing range of eyepiece 306 if, in the eye sensor image, no eye is detected within eyepiece 306. If an eye is determined to be absent, then it is inferred that an eye of a user is not gazing through eyepiece 306 to view imagery presented by display device 302. In such case, the eye tracking data indicates that an eye of a user is not gazing through an eyepiece.

Additionally or alternatively, eye tracking data is generated based on tracking a gaze direction of a user's eye. For example, the gaze direction of an eye 318, as detected by eye sensor 308, may indicate that the eye 318 is gazing through eyepiece 306. In such case, the eye tracking data indicates that an eye of a user is gazing through an eyepiece. Alternatively, the gaze direction of eye 318, as detected by eye sensor 308, may indicate that the eye 318 is not gazing through eyepiece 306, such as when the user is looking downward at master controls 204 or foot pedals 206. In such case, the eye tracking data indicates that an eye of a user is not gazing through an eyepiece.

In some embodiments, the gaze direction of the eye 318, as detected by eye sensor 308, may further indicate that the user's eye is gazing at a particular region of imagery presented by display devices 302 (e.g., a peripheral area where supplemental visual content is presented rather than a main area where imagery of a surgical area associated with a patient is presented). Accordingly, eye tracking data may additionally indicate a particular region of imagery presented by display devices 302 to which the user's gaze is directed.

Exemplary eye sensor images, and eye tracking data that may be generated from such eye sensor images, will now be described with reference to FIGS. 4A-4D. FIG. 4A illustrates an exemplary eye sensor image 400A as captured by imaging device 314. As shown in FIG. 4A, eyes 318 (e.g., the pupils) are detected within eyepieces 306, but a gaze of eyes 318 is directed toward a peripheral region of the imagery presented by the image display system. Accordingly, eye tracking data generated based on eye sensor image 400A indicates that an eye of a user is gazing through an eyepiece. In some examples, the eye tracking data may also specify a particular region of the imagery to which eyes 318 are directed (e.g., a peripheral region where supplemental visual content is presented).

FIG. 4B illustrates another exemplary eye sensor image 400E captured by imaging device 314. As shown, eyes 318 are looking away from eyepieces 306 (e.g., looking down at foot pedals 206), and eyes 318 (e.g., the pupils) are not detected within eyepieces 306. Accordingly, eye tracking data generated based on eye sensor image 400E indicates that an eye of a user is not gazing through an eyepiece.

FIG. 4C illustrates another exemplary eye sensor image 400C captured by imaging device 314. As shown, no eyes are detected within eyepieces 306. Accordingly, eye tracking data generated based on eye sensor image 400C indicates that no eye of a user is gazing through an eyepiece.

FIG. 4D illustrates another exemplary eye sensor image 400D captured by imaging device 314. As shown, eyes 318 are detected within eyepieces 306, but eyes 318 are looking away from eyepieces 306 (e.g., looking down at foot pedals 206). If the eye tracking data generated from eye sensor image 400D is based on the presence of eyes 318 within eyepieces 306, the eye tracking data indicates that an eye of a user is gazing through an eyepiece. However, if the eye tracking data generated from eye sensor image 400D is additionally or alternatively based on the detected gaze direction of eyes 318, the eye tracking data indicates that an eye of a user is not gazing through an eyepiece.

In some examples, eye tracking data may indicate that an eye of a user is gazing through an eyepiece only when the eye is determined to be gazing through the eyepiece for at least a predetermined period of time (e.g., 5 seconds). Additionally or alternatively, eye tracking data may indicate that an eye of a user is not gazing through an eyepiece only when the eye is determined to be not gazing through the eyepiece for at least another predetermined period of time (e.g., 3 seconds).

In some examples, eye sensor 308 may implement a temporal filter configured to filter out temporary, intermittent loss of eye presence or gaze direction tracking caused by blinking of the eye. Any suitable temporal filter or temporal filtering technique may be used. With this configuration, blinking of an eye will not trigger a change in operating mode of user control system 200.

Figure 5:
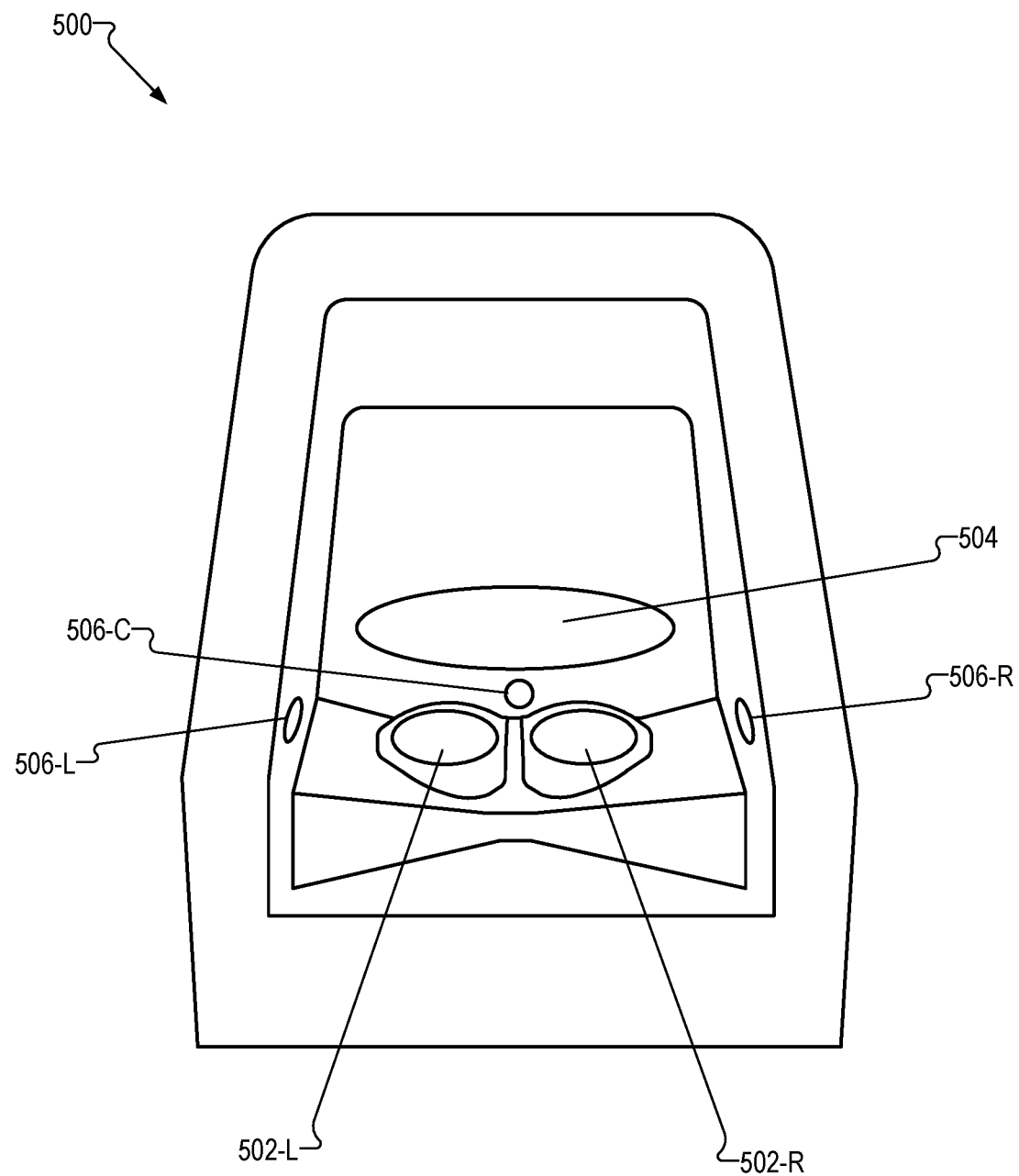
FIG. 5 illustrates an exemplary viewer console that may be included in the user control system of FIG. 2 according to principles described herein.

Referring again to FIG. 2, viewer console 210 facilitates viewing of the imagery presented by image display system 208, FIG. 5 illustrates an exemplary viewer console 500 that may be included in display module 202. As shown, viewer console 500 includes eyepieces 502 (e.g., left eyepiece 502-L and right eyepiece 502-R), a headrest 504, and a plurality of head sensors 506 (e.g., left head sensor 506-L, center head sensor 506-C, and right head sensor 506-R). While FIG. 5 shows three head sensors 506, viewer console 500 may include any number of head sensors as may suit a particular implementation.

In some examples, eyepieces 502 are separate from the eyepieces of image display system 208 (e.g., eyepieces 306 of image display system 300) but optically aligned with the eyepieces of the image display system. Alternatively, eyepieces 502 are a portion of image display system 208, For example, eyepieces 502 may be distal end portions of eyepieces 306 that protrude from an exterior surface of display module 202 (e.g., an exterior surface of viewer console 500).

Headrest 504 is located above eyepieces 502 such that, when a user is positioned at viewer console 500, the user may rest the user's head on headrest 504 while looking into eyepieces 502. In some examples, headrest 504 may include a headrest sensor (not shown) configured to detect when a head of a user is resting on headrest 504. A headrest sensor may be implemented by any suitable sensor, such as a force-torque (FT) sensor.

Head sensors 506 may be configured to detect a proximity (e.g., distance) of a user's head from head sensors 506. Head sensors 506 may be implemented by any suitable sensor. Any suitable range or proximity sensors may be used, including those that operate based on range imaging, triangulation (e.g., stereo triangulation, IR triangulation, etc.), interferometry, ultrasound, laser (e.g., LIDAR), structured light, and time-of-flight (TOF). Head sensors 506 may sample at any regular interval as may suit a particular implementation (e.g., 100 Hz). Additionally or alternatively to head sensors, a depth camera may be utilized to determine a proximity of the user's head from viewer console 500. Head sensors 506 may include or be implemented by any components as may suit a particular implementation, such as an emitter, a receiver, a processing facility, a memory, a computing device (e.g.; a computing device included in auxiliary system 106), and the like.

Head sensors 506 may be located in viewer console 500 at any suitable location. In some examples, head sensors 506 are positioned to point toward a user's skin (e.g., temples or cheek bones) when the user's head is positioned within a vicinity of viewer console 500. As shown in FIG. 5, head sensor 506-L is positioned on a left side of viewer console 500 (e.g., at a position pointing to a left temple or left cheek bone of the user's head when the user's head is positioned in viewer console 500), head sensor 506-C is positioned at a center of viewer console 500 (e.g., at a position pointing to a forehead of the user when the user's head is positioned in viewer console 500), and head sensor 506-R is positioned on a right side of viewer console 500 (e.g., at a position pointing to a right temple or right cheek bone of the user's head when the user's head is positioned in viewer console 500).

The detection result of head sensors 506 may be used to generate head presence data. Head presence data may be representative of a real-time head presence state of user control system 200. Head presence data may indicate a proximity and/or a position of a head of a user relative to viewer console 500. Head presence data may also indicate a presence of a head of a user within a vicinity of viewer console 500 or an absence of a head of a user within the vicinity of viewer console 500. In some examples, a head of a user is present within the vicinity of viewer console 500 when the head (e.g., a surface of the head, such as the forehead, a temple, or a cheek) is determined to be located within a predetermined distance (e.g., 100 mm) of one or more of head sensors 506. In some examples, to prevent false positive determinations of head presence, a head of a user is determined to be present when the head is determined to be located within a predetermined distance of each of a plurality of head sensors. In additional examples, since a human head is generally laterally symmetric when oriented toward viewer console 500, a head of a user is determined to be present when proximity measurements by a plurality of head sensors are comparable (e.g., the proximity measurements differ by no more than a predetermined tolerance, e.g., 5 mm, 10%, etc.).

In some examples, head presence may also be determined based on a rate of change of proximity as measured by the head sensor(s). For example, a head may be determined to be present only after the rate of change of proximity is at or below a predetermined threshold value. In this way, a head may be determined as not present while the user is moving into position, and then the head may be determined to be present only after the user has settled into position.

In some examples, head presence data may indicate that a head of a user is present within the vicinity of viewer console 500 only when the head is determined to be located within the predetermined distance of one or more of head sensors 506 for at least a predetermined period of time (e.g., 5 seconds). Additionally or alternatively, head presence data may indicate that a head of a user is absent within the vicinity of viewer console 500 only when the head is determined to be outside of the predetermined distance of one or more of head sensors 506 for at least another predetermined period of time (e.g., 2 seconds).

In some examples, the predetermined distance used to determine head presence may be different depending on the operating mode in which the user control system is operating. To illustrate, when the user control system is operating in an inactive operating mode, the predetermined distance may be a first distance (e.g., 40 mm), and when the user control system is operating in an active operating mode, the predetermined distance may be a second distance longer than the first distance (e.g., 80 mm). In this way, a head of the user must be closer to the viewer console in the inactive operating mode than in the active operating mode to trigger a head presence detection. This allows the user to slightly relax his or her posture in the active operating mode after the user has entered into the active operating mode.

Figure 6A:
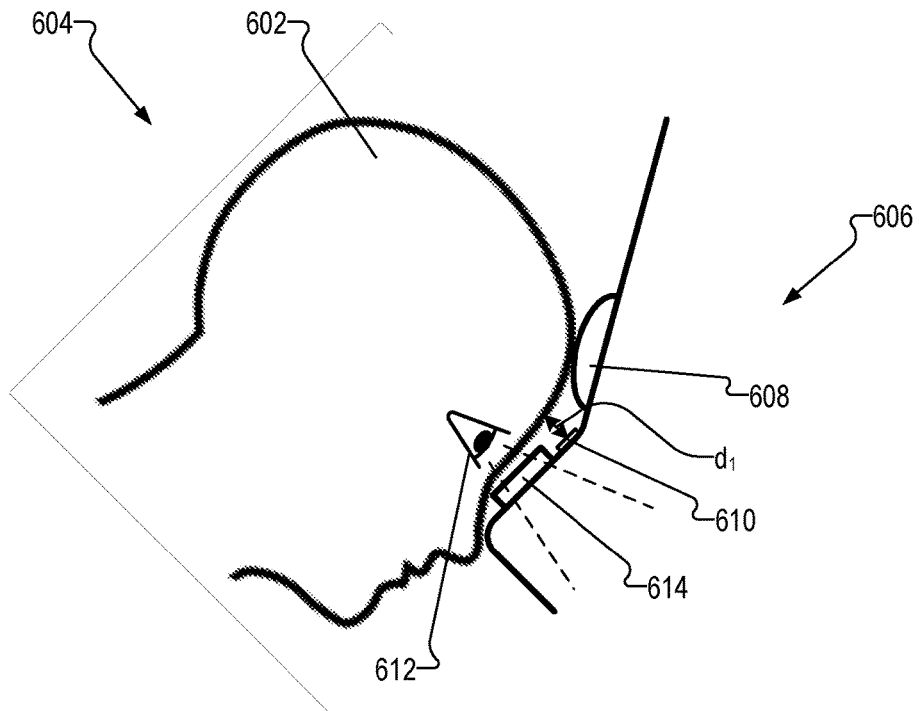
FIGS. 6A-8 illustrate various head positions that may be detected by head sensors included in a viewer console according to principles described herein.
Figure 6B:
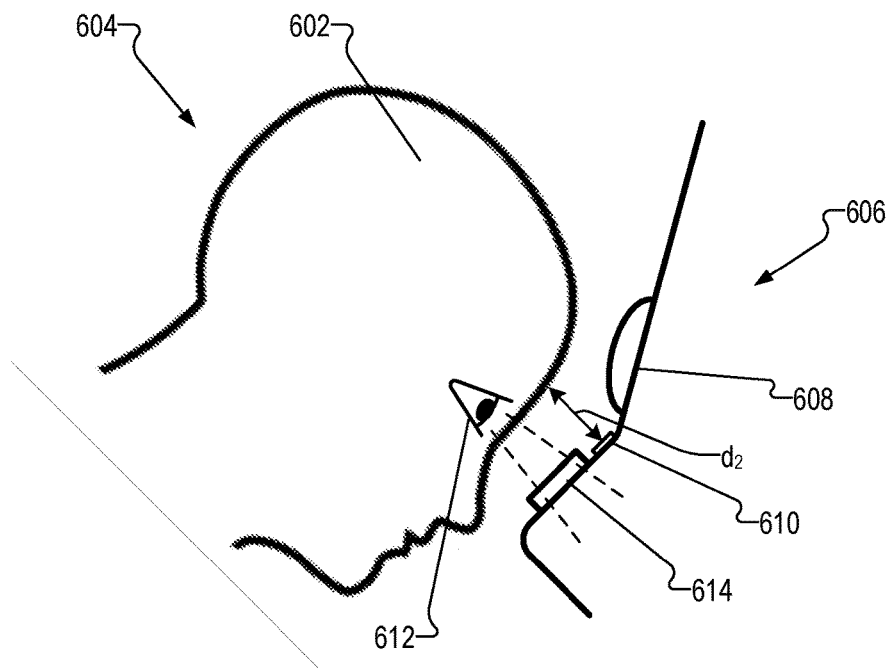

Various head positions that may be detected by head sensors 506, and head presence data that may be generated based on such head positions, will now be described with reference to FIGS. 6A-8. As shown in FIG. 6A, a head 602 of a user 604 is positioned in front of a viewer console 606 of a user control system. Head 602 is resting on headrest 608, and a distance $d_1$ between head sensor 610 and head 602, as measured by head sensor 610, is less than a predetermined distance. An eye 612 of user 604 is gazing into eyepiece 614 to view imagery presented by an image presentation system of the user control system. FIG. 6B is similar to FIG. 6A except that head 602 is in a hovering state above viewer console 606, i.e., head 602 is not in contact with headrest 608 or any other portion of viewer console 606. However, a distance $d_2$ between head sensor 610 and head 602 is less than a predetermined distance. In the examples of FIGS. 6A and 6B, head presence data generated based on a detection result of head sensor 610 indicates that a head of a user is present within a vicinity of the viewer console because head 602 is in contact with headrest 608 or because head 602 is located within the predetermined distance from head sensor 610. In both scenarios, eye tracking data also indicates that an eye of a user is gazing through an eyepiece because eye 612 is detected within the viewing range of eyepiece 614 and/or is detected to be gazing at imagery presented by the image presentation system.

Figure 7A:
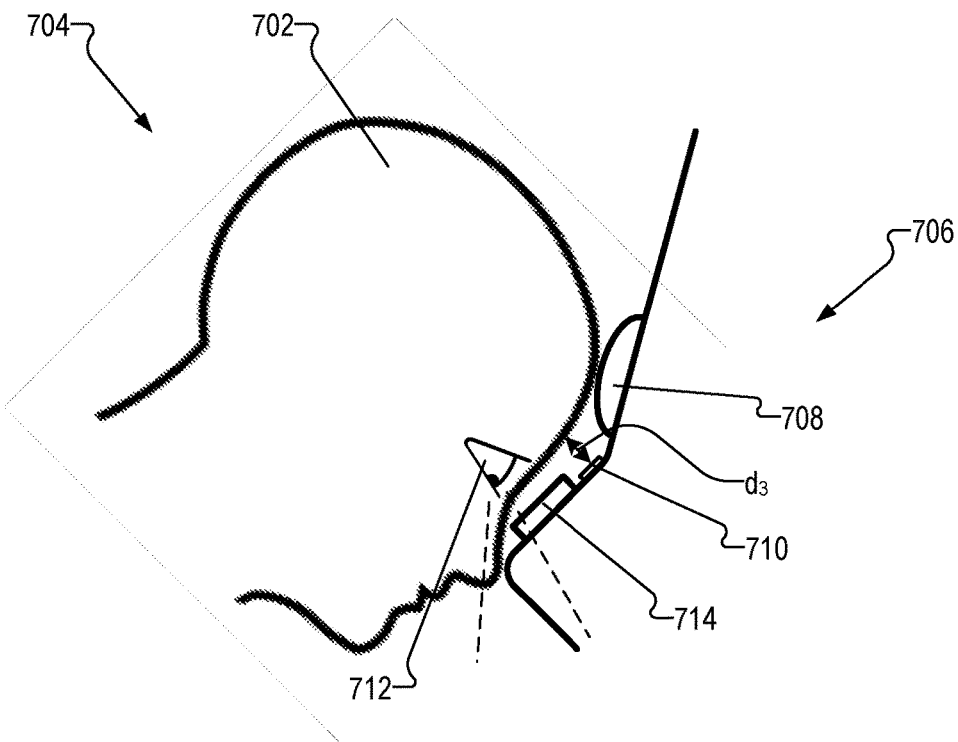
Figure 7B:
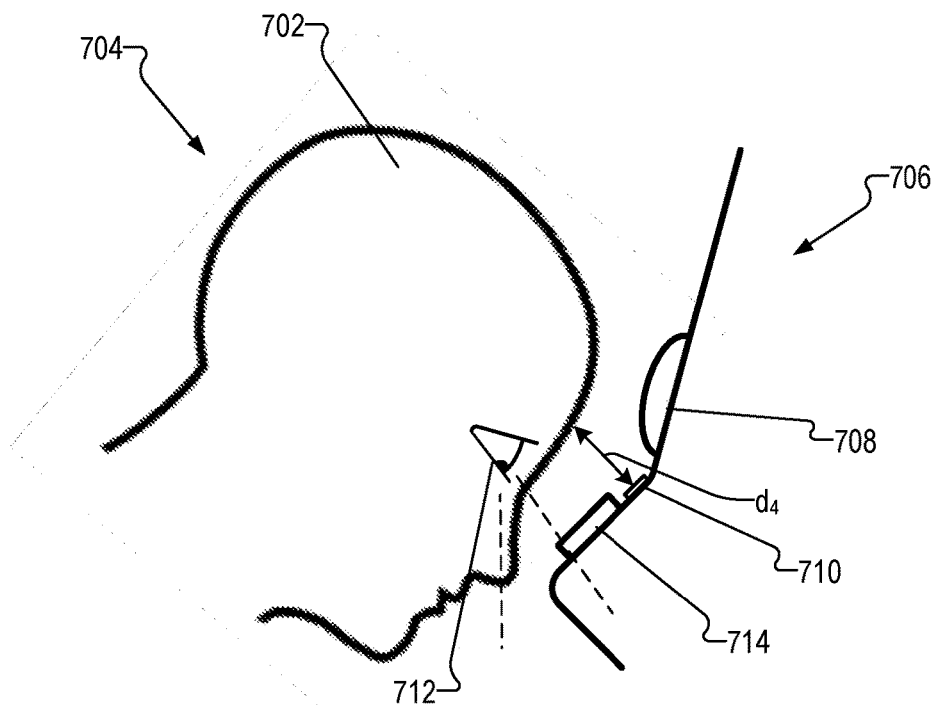

As shown in FIG. 7A, a head 702 of a user 704 is positioned in front of a viewer console 706 of a user control system. Head 702 is resting on headrest 708, and a distance $d_3$ between head sensor 710 and head 702 is less than a predetermined distance. An eye 712 of user 704 is looking away from eyepiece 714. For example, user 704 may be looking at foot pedals (e.g., foot pedals 206) of the user control system or at his or her hands. FIG. 7B is similar to FIG. 7A except that head 702 is in a hovering state above viewer console 706, e.g.; head 702 is not in contact with headrest 708 or any other portion of viewer console 706. However, a distance $d_4$ between head sensor 710 and head 702 is less than the predetermined distance. In the examples of FIGS. 7A and 7B, the head presence data indicates that a head of a user is present within the vicinity of the viewer console 706 because head 702 is in contact with headrest 708 or because head 702 is located within the predetermined distance from head sensor 710. In both scenarios, eye tracking data indicates that an eye of a user is not gazing through an eyepiece because eye 712 is not detected within the viewing range of eyepiece 714 and/or is detected to not be gazing at imagery presented by the image presentation system.

Figure 8:
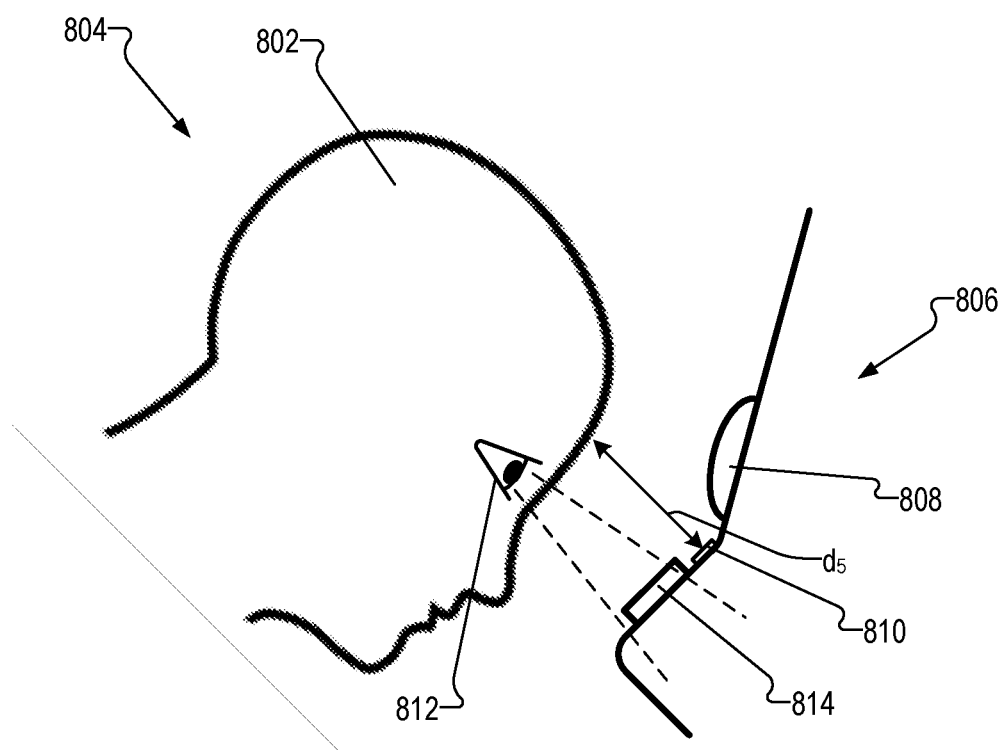

As shown in FIG. 8, a head 802 of a user 804 is positioned in front of a viewer console 806 of a user control system. Head 802 is in a hovering state above viewer console 806, e.g., head 802 is not in contact with headrest 808 or any other portion of viewer console 806, and a distance $d_5$ between head sensor 810 and head 802 is less than the predetermined distance. An eye 812 of user 804 is looking toward eyepiece 814. In the example of FIG. 8, the head presence data indicates that a head of a user is absent within the vicinity of viewer console 806 because distance $d_5$ is greater than the predetermined distance. Depending on the sensitivity and/or range of an eye sensor, the eye tracking data could indicate that an eye of a user is either gazing through an eyepiece or not gazing through the eyepiece.

The predetermined distance for determining head presence may be set in any suitable way. In some examples, the predetermined distance may be a fixed value that is set in advance (e.g., prior to shipment or delivery of the computer-assisted surgical system). Additionally or alternatively, the predetermined distance may be manually set by a user. In further examples, because a user will self-regulate the viewing distance so that most or all of the imagery presented by the image display system is visible and not occluded by the exit pupil of eyepieces 502, the predetermined distance may be determined and adjusted automatically (e.g., by user control system 200) based on head presence data tracked over time. For instance, a particular proximity or proximity range for long periods of time, or during periods of time during which surgical procedures are performed, may be indicative of a head present state. Accordingly, the predetermined distance may be set based on tracked head proximity indicative of a head present state.

Figure 9:
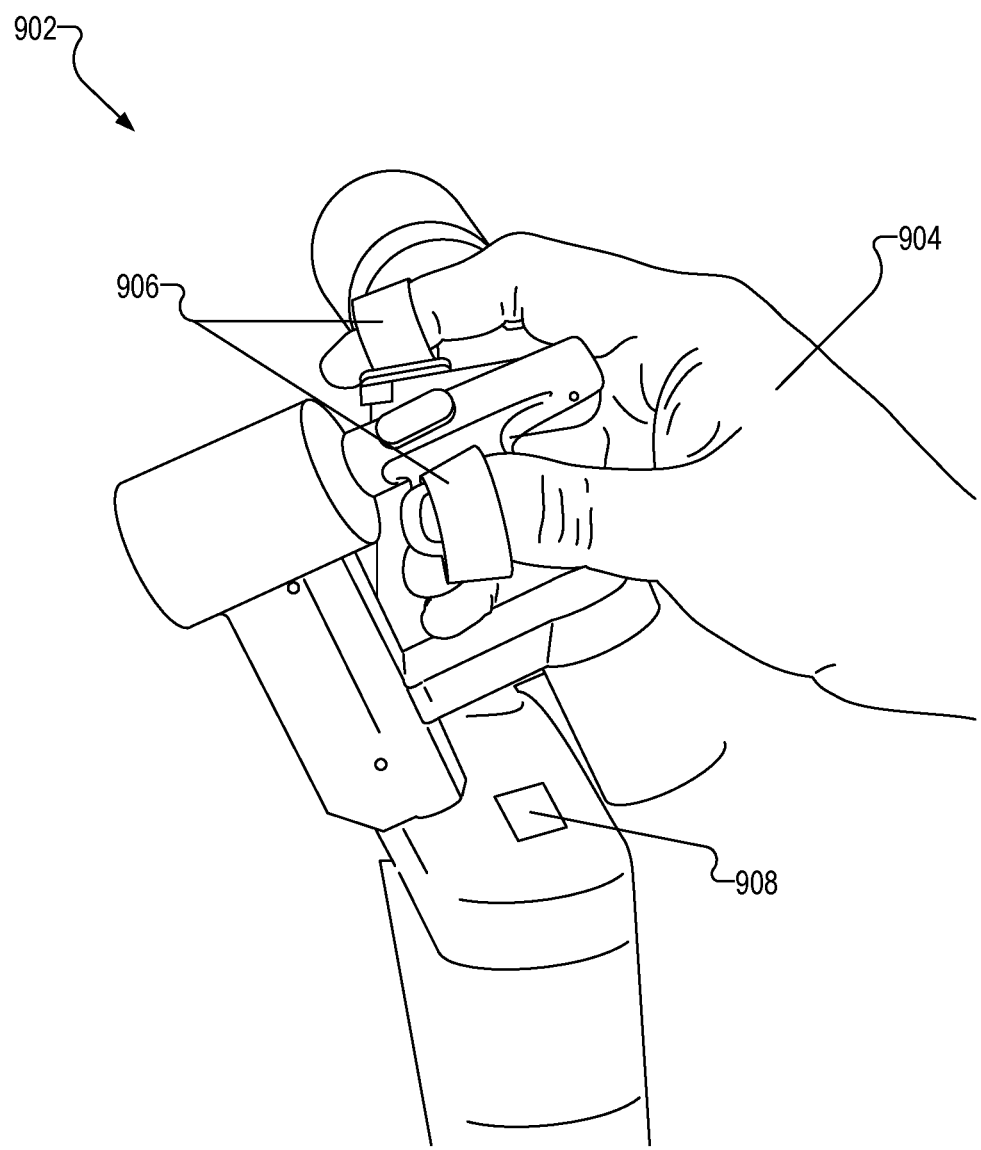
FIG. 9 illustrates an exemplary master control that may be included in the user control system of FIG. 2 according to principles described herein.

Referring again to FIG. 2, master controls 204 (e.g., a left master control 204-L and a right master control 204-R) may be manipulated by surgeon 110-1 to control movement of surgical instruments (e.g., by utilizing robotic and/or tele-operation technology). FIG. 9 illustrates an exemplary master control 902 that may be included in user control system 200. As shown, master control 902 is configured to be manipulated by a right hand 904 of a surgeon (e.g., surgeon 110-1). User control system 200 may also include a left hand master control configured to be manipulated by a left hand of the surgeon. The left hand master control may be similar to master control 902 and therefore discussion of the left hand master control is omitted. As shown, master control 902 includes finger loops 906 configured to receive a finger and/or thumb of the surgeon. Master control 902 may also include a variety of mechanisms (e.g., buttons, levers, joints, pivot points, etc.) as may suit a particular implementation. Master control 902 may be configured to detect a variety of hand, wrist, and finger movements by the surgeon to control movement of surgical instruments. Accordingly, the surgeon may manipulate master control 902 in various ways and with multiple degrees of freedom in order to telemanipulate a surgical instrument.

In some examples surgical system 100 (e.g., manipulating system 102, user control system 104, and/or auxiliary system 106) may receive from master control 902 information regarding position, pose, orientation, movement, state, etc. of master control 902 and/or information regarding user interaction with master control 902. Based on the information received from master control 902, surgical system 100 may track the position, pose, orientation, movement, state, and/or other attributes of master control 902.

In some examples, user control system 200 may also include a hand sensor configured to detect a presence of a hand of a user within a vicinity of master control 902. The hand sensor may be implemented by any suitable sensor configured to detect a proximity of a hand to master control 902 and/or detect physical contact of a hand of a user with master control 902. Suitable hand sensors may include, but are not limited to, range or proximity sensors, IR beam-break sensor, capacitive touch sensors, force-torque sensors, and the like. Additionally or alternatively to hand sensors, a depth camera may be positioned on user control system 200 to determine a proximity of the user's hand from master control 902.

As shown in FIG. 9, user control system 200 includes a hand sensor 908 configured to detect a proximity of hand 904 to master control 902. Hand sensor 908 may be implemented, for example, by a TOF proximity sensor positioned to face the palm of hand 904 when hand 904 is gripping or approaching master control 902. Hand sensor 908 may be positioned in any suitable location configured to detect a proximity of hand 904 (e.g., a palm, fingers, thumb, etc.).

The detection result of a hand sensor may be used to generate hand presence data, Hand presence data may be representative of a real-time hand presence state of user control system 200. Hand presence data may indicate a presence of a hand of a user within a vicinity of master control 902 or an absence of a hand of a user within a vicinity of master control 902. In some examples, a hand is present within a vicinity of master control 902 only when the hand is detected to be in physical contact with master control 902 (e.g., in contact with finger loops 906). In another example, a hand is present within a vicinity of master control 902 when the hand is detected to be located within a predetermined distance of master control 902.

In some examples, hand presence data may additionally or alternatively be generated based on kinematic information generated by master control 902 regarding a position, pose, orientation, movement, state, etc. of master control 902. For example, a deliberate gesture provided by a user by way of master control 902 (e.g., a pinch of finger loops 906) may indicate that a hand of a user is in physical contact with master control 902.

As will be explained below in more detail, when user control system 200 is operating in an active operating mode, user control system 200 may process the information received from master controls 204 to generate information and/or signals to send to manipulator arms 112 to cause manipulator arms 112 and/or surgical instruments to follow master controls 204, e.g., to operate in accordance with the information received from master controls 204. In this or a similar manner, surgical system 100 may translate attributes of master controls 204 into corresponding operations of manipulator arms 112 and surgical instruments, such as by translating movement of master controls 204 into corresponding movement of manipulator arms 112 and surgical instruments. In this way, surgical system 100 couples master controls 204 to manipulator arms 112 such that a surgeon may telemanipulate surgical instruments attached to manipulator arms using master controls 204.

In some examples, surgical system 100 may require that the user provide user input via master controls 204 before the user may operate user control system 200 and/or interact with features of user control system 200, such as interact with master controls 204 to control surgical instruments, etc. Accordingly, in some examples surgical system 100 may require the user to perform a deliberate movement of a master control 204 (e.g., a finger pinch, a gesture, a movement in a particular direction or in a particular pattern, etc.) in order to initiate control of a surgical instrument associated with the master control 204. The deliberate movement confirms that the user's hand is present within a vicinity of master control 204 (e.g., that the hand is grasping the master control 204 and/or the user's fingers are coupled within finger loops of the master control 204). As will be explained below in more detail, upon confirmation of hand presence, user control system 200 may operate in an active control state, and surgical instrument control may be suspended and resumed during master clutch and camera control operations without requiring additional deliberate input steps by the user. As will be explained below, the deliberate user input by way of master controls 204 may be a form of user validation that confirms that the user is allowed to operate user control system 200.

Foot pedals 206 (e.g., foot pedals 206-1 through 206-5) facilitate control of surgical instruments. While FIG. 2 shows five foot pedals 206, user control system 200 may have fewer or more foot pedals as may suit a particular implementation. Foot pedals 206 enable surgeon 110-1 to perform various operations, such as swapping control of surgical instruments, controlling features of an imaging system (e.g., endoscope), and activating surgical instrument features (e.g., energizing a cautery instrument, firing a stapling instrument, etc.).

As shown in FIG. 2, user control system 200 also includes an armrest 214 to support the arms of the user while the user is operating master controls 204.

In some examples, user control system 200 may also include one or more auxiliary controls configured to allow a user to control various components or settings of user control system 200 and/or surgical system 100 other than surgical instruments and/or manipulator arms 112. For example, as shown in FIG. 2 user control system 200 includes a set of controls 216 (e.g., soft buttons, hard buttons, knobs, dials, joysticks, etc.) that may be manually operated by the user to effectuate a positional adjustment of one or more components of user control system 200. To illustrate, user control system 200 may be configured to adjust a position (e.g., height, extension, tilt, etc.) of one or more components of user control system 200 (e.g., display module 202, master controls 204, foot pedals 206, eyepieces 212, armrest 214, etc.) to optimize ergonomics for the user. As shown in FIG. 2, controls 216 are located on armrest 214. However, controls 216 are not limited to this location, and may be located on user control system 200 at any other suitable location(s).

Additionally, as shown in FIG. 2, user control system 200 includes a touchscreen display 218 with which a user of user control system 200 may view content and interact (e.g., by way of touch gestures) to provide user input to surgical system 100. Touchscreen display 218 may present content such as user login information, surgical team member information, settings information (surgical system settings, user control system settings, ergonomic position settings, etc.) and/or any other visual content as may serve a particular implementation. Additionally or alternatively, touchscreen display 218 may include an operation panel (e.g., a number pad, a keypad, a set of buttons, etc.) configured to receive user input (e.g., a username, a password, user profile information, user preference information, system settings information, etc.). As shown in FIG. 2, touchscreen display 218 is positioned at a center portion of armrest 214. However, touchscreen display 218 may be positioned on user control system 200 at any other location as may suit a particular implementation.

In some examples, surgical system 100 may require user authentication before the user may operate user control system 200 and/or interact with features of user control system 200, such as interact with controls 216, interact with touchscreen display 218, etc. Accordingly, touchscreen display 218 may display an authentication interface, and the user may provide, by way of touchscreen display 218, authentication information (e.g., login name, password, personal identification number (PIN), biometric information (e.g., a fingerprint), etc.). Upon successful authentication of the user, the user may be permitted to operate user control system 200. As will be explained below, user authentication may be an additional or alternative form of user validation that confirms that the user is allowed to operate user control system 200.

To facilitate user interaction with the various input devices included in user control system 200 (e.g., master controls 204, foot pedals 206, controls 216, and/or touchscreen display 218), user control system 200 may include an illumination system configured to provide task lighting for any one or more of the input devices and/or any other components of user control system 200. The illumination system may include, for example, one or more lights (e.g., LEDs) positioned (e.g., on an underside of display module 206, on armrest 214, etc.) to illuminate each input device. As an example, user control system 200 may include a first task light configured to illuminate left master control 204-L, a second task light configured to illuminate right master control 204-R, and a third task light configured to illuminate foot pedals 206.

As will be explained below in more detail, an illumination state of each of the various task lights of the illumination system may be responsive to a detected user presence state and user intent to interact with user control system 200. Accordingly, the illumination state of the illumination system may be adjusted in accordance with a current operating mode of user control system 200.

Figure 10:
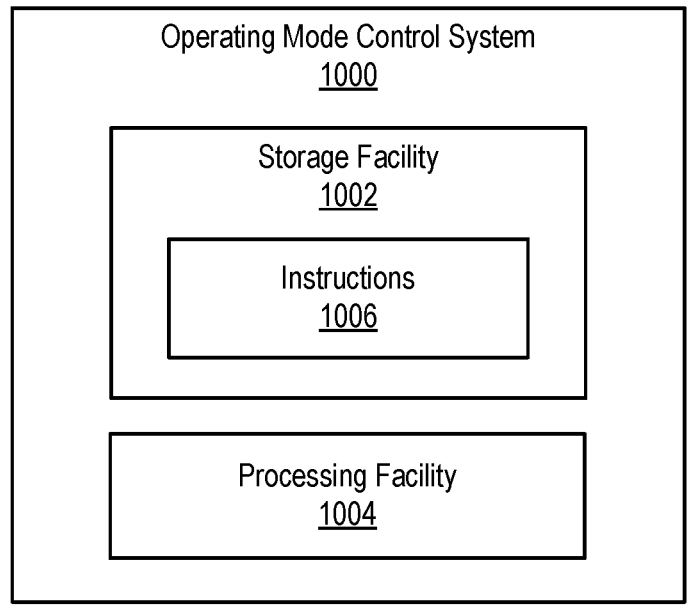
FIG. 10 illustrates an exemplary operating mode control system according to principles described herein.

As mentioned, user control system 200 may be configured to operate in a plurality of different operating modes. FIG. 10 illustrates an exemplary operating mode control system 1000 ("operating mode system 1000") configured to control an operating mode in which a user control system (e.g., user control system 200) is to operate. As shown, operating mode system 1000 may include, without limitation; a storage facility 1002 and a processing facility 1004 selectively and communicatively coupled to one another, Facilities 902 and 904 may each include or be implemented by hardware and/or software components (e.g., processors, memories, communication interfaces, instructions stored in memory for execution by the processors, eta), In some examples, facilities 902 and 904 may be distributed between multiple devices and/or multiple locations as may serve a particular implementation.

Storage facility 1002 may maintain (e.g., store) executable data used by processing facility 1004 to perform any of the operations described herein. For example, storage facility 1002 may store instructions 1006 that may be executed by processing facility 1004 to perform any of the operations described herein, Instructions 1006 may be implemented by any suitable application, software, code, and/or other executable data instance.

Storage facility 1002 may also maintain any data received, generated, managed, used, and/or transmitted by processing facility 1004. For example, as will be described below in more detail, storage facility 1002 may maintain head presence data, eye tracking data, image data, operating mode data, user profile data, and the like.

Processing facility 1004 may be configured to perform (e.g., execute instructions 1006 stored in storage facility 1002 to perform) various processing operations associated with selecting and activating an operating mode of user control system. For example, processing facility 1004 may access head presence data generated by a head sensor included in a user control system of a computer-assisted surgical system, the head presence data indicating a presence or an absence of a head of a user within a vicinity of a viewer console included in the user control system. Processing facility 1004 may also access eye tracking data generated by an eye sensor included in the user control system, the eye tracking data indicating whether an eye of a user is gazing through an eyepiece included in the user control system, Processing facility 1004 may also access hand presence data generated by a hand sensor included in the user control system, the hand presence data indicating a presence or an absence of a hand of the user within a vicinity of a master control included in the user control system. In some examples, processing facility 1004 may also implement a part of the head sensor, the eye sensor, and/or the hand sensor by generating the head presence data, the eye tracking data, and/or the hand presence data based on the detected signals from the respective sensor.

Based on the head presence data, the eye tracking data, and/or the hand presence data, processing facility 1004 may select a particular operating mode from among various available operating modes and direct the user control system to operate in accordance with the selected operating mode. These and other operations that may be performed by processing facility 1004 are described herein.

In some examples, operating mode system 1000 is implemented entirely by the computer-assisted surgical system itself. For example, operating mode system 1000 may be implemented by one or more computing devices included in surgical system 100 (e.g., in one or more computing devices included within manipulating system 102, user control system 104, and/or auxiliary system 106).

Figure 11:
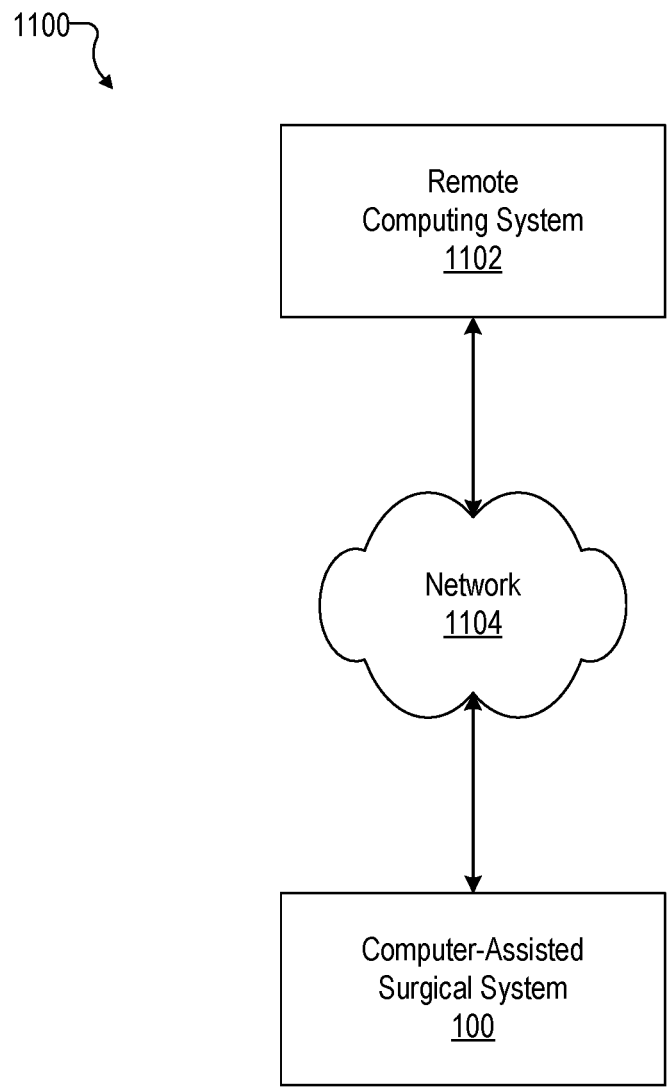
FIG. 11 illustrates an exemplary implementation of the operating mode control system illustrated in FIG. 10 according to principles described herein.

FIG. 11 illustrates another exemplary implementation 1000 of operating mode system 1000. In implementation 1000, a remote computing system 1102 may be communicatively coupled to surgical system 100 by way of a network 1104. Remote computing system 1102 may include one or more computing devices (e.g., servers) configured to perform any of the operations described herein. In some examples, operating mode system 1000 may be entirely implemented by remote computing system 1102. Alternatively operating mode system 1000 may be implemented by both remote computing system 1102 and surgical system 100.

Network 1104 may be a local area network, a wireless network (e.g., Wi-Fi), a wide area network, the Internet, a cellular data network, and/or any other suitable network. Data may flow between components connected to network 1104 using any communication technologies, devices, media, and protocols as may serve a particular implementation.

Various operations that may be performed by operating mode system 1000 (e.g., by processing facility 1004 of operating mode system 1000), and examples of these operations, will now be described. It will be recognized that the operations and examples described herein are merely illustrative of the many different types of operations that may be performed by operating mode system 1000.

Operating mode system 1000 may access head presence data. As explained above, head presence data may indicate either a presence of a head of a user within a vicinity of a viewer console included in the user control system or an absence of a head of a user within the vicinity of the viewer console. Head presence data may additionally or alternatively indicate a position or proximity of a user's head with respect to the viewer console, Head presence data may be generated by a head sensor (e.g., one of head sensors 506) included in a user control system of a computer-assisted surgical system, by one or more computing components coupled to the head sensor and included in the computer-assisted surgical system (e.g., auxiliary system 106, processing facility 1004, etc.), by a remote computing device (e.g., remote computing system 1102), and/or by any other device associated with the computer-assisted surgical system as may serve a particular implementation. In some examples, head presence data is stored in and/or accessed from storage facility 1002.

In some examples, head presence data may additionally or alternatively be generated based on the detection result of the eye sensor. In these examples, the presence or absence of a head of the user may be inferred from the presence or absence of an eye of the user or a gaze direction of the eye of the user since, in nearly all cases, the head of the user will be present within the vicinity of the viewer console when the eye of the user is detected to be gazing through the eyepiece. Accordingly, in some examples the user control system may not include any head sensors.

Operating mode system 1000 may also access eye tracking data. As explained above, eye tracking data may indicate either that an eye of a user is gazing through an eyepiece included in the user control system or that an eye of a user is not gazing through the eyepiece. Eye tracking data may additionally or alternatively indicate a direction of gaze of the user's eye. Eye tracking data may be generated based on a detection result by an eye sensor (e.g., eye sensor 308) included in the user control system. Such eye tracking data may be generated by the eye sensor (e.g. by imaging device 314), by one or more computing components coupled to the eye sensor and included in the computer-assisted surgical system (e.g., auxiliary system 106, processing facility 1004, etc.), by a remote computing device (e.g.; remote computing system 1102), and/or by any other device associated with the computer-assisted surgical system as may serve a particular implementation. In some examples, eye tracking data is stored in and/or accessed from storage facility 1002.

In some examples, operating mode system 1000 may access hand presence data. As explained above, hand presence data may indicate a presence of a hand of a user within a vicinity of a master control included in the user control system or an absence of a hand of a user within the vicinity of the master control. Hand presence data may additionally or alternatively indicate a position, proximity, or contact of a hand with respect to a master control. Hand presence data may be generated by a hand sensor included in a user control system of a computer-assisted surgical system, by one or more computing components coupled to the hand sensor and included in the computer-assisted surgical system (e.g., auxiliary system 106, processing facility 1004, etc.), by a remote computing device (e.g., remote computing system 1102), and/or by any other device associated with the computer-assisted surgical system as may serve a particular implementation. In some examples, hand presence data is stored in and/or accessed from storage facility 1002.

Operating mode system 1000 may select, based on the accessed head presence data, the accessed eye tracking data, and/or the accessed hand presence data, an operating mode from among various available operating modes for a user control system of a computer-assisted surgical system (e.g., surgical system 100) and direct the user control system to operate in accordance with the selected operating mode. As will be described below, each different operating mode may provide a distinct combination of settings relating to the response of user control system to user input (e.g., manual user input via master controls 204, foot pedals 206, controls 216, and/or touchscreen display 218; voice input via one or more microphones; etc.), the sensitivity of the user control system to user input, information presented to the user by way of the user control system (e.g., visual, audio, and/or haptic information), the availability of user control system features, levels for certain user control system outputs (e.g., illumination levels of illumination system lighting and speaker volume levels), and the like. Some of these settings may be user defined and thus maintained with a user profile.

In some examples, operating mode system 1000 may be configured to select an operating mode from among an active operating mode, a suspended operating mode, and an inactive operating mode. Examples of various settings and configurations of the active operating mode, suspended operating mode, and inactive operating mode will now be explained. These examples are merely illustrative and are not limiting.

While operating in the active operating mode, the user control system may be configured to enable control of operations performed by the surgical system based on input provided by a user by way of the user control system. For example, surgical instruments coupled to manipulator arms 112 may be configured to follow (e.g., mimic) movement of master controls 204 and respond to operation of foot pedals 206. To illustrate, when a user moves left master control 204-L to the left and then pinches or squeezes left master control 204-L, a surgical instrument controlled by left master control 204-L (e.g., a grasping instrument) likewise moves to the left and then an end effector of the surgical instrument closes (e.g., grasps). As another example, when a user presses foot pedal 206-5, an operation of a surgical instrument feature controlled by foot pedal 206-5 is activated (e.g., a stapling instrument s fired or a cautery instrument is energized).

To further enable control of operations performed by the surgical system while user control system is operating in the active operating mode, an image display system of the user control system may be configured to present imagery generated by the surgical system (e.g., imagery of a surgical area associated with a patient).

Additionally, while operating in the active operating mode the user control system may be configured to apply a first configuration for an illumination system of the user control system. The first configuration may specify an illumination level for each task light included in the illumination system. For example, the user control system may set the illumination level of task lights for master controls 204 and foot pedals 206 to a first level (e.g., a minimum level or a user-specified predetermined level) and turn off turn touchscreen display 218. In this way illumination provided by the illumination system during the active operating mode does not distract the user while the user is viewing imagery presented by the image display system and/or controlling operations performed by the surgical system.

Additionally, while operating in the active operating mode the user control system may be configured to prevent or slow down adjustment of ergonomic adjustments of the user control system, thereby limiting distraction to the user.

While operating in the suspended operating mode, the surgical system may be configured to respond differently, as compared with the active operating mode, to user input provided by way of the user control system (e.g., by way of master controls 204 and/or foot pedals 206). For example, user control system 200 may be configured to suspend control of operations performed by the surgical system based on input provided by the user by way of user control system 200. For instance, surgical instruments coupled to manipulator arms 112 may be configured to not follow movement of master controls 204 or respond to operation of foot pedals 206. Rather, the surgical instruments may be configured to remain static and/or inoperable even if the user manipulates master controls 204 or operates foot pedals 206. In some examples, user control system 200 may suspend the output of information received from master controls 204 to manipulating system 102 and/or auxiliary system 106.

Additionally or alternatively to suspending control of operations performed by the surgical system, the user control system (e.g., master controls 204, foot pedals 206, etc.) may provide visual, audio, or haptic feedback to the user to indicate to the user that the user control system is operating in the suspended operating mode. For instance, touchscreen display 218 may display a notification or message to the user. As another example, a speaker included in user control system 200 may output a notification tone or a spoken message. As another example, when a user manipulates master control 204-L while user control system 200 is operating in the suspended operating mode, master control 204-L may vibrate and/or remain locked in its present position so that the user cannot move or manipulate master control 204-L.

While operating in the suspended operating mode, the user control system may additionally or alternatively be configured to apply a second configuration for the illumination system of the user control system. For example, the user control system may set the illumination level of master controls 204 and foot pedals 206 to a second level different than the first level (e.g., a maximum level or another user-specified predetermined level) and turn on touchscreen display 218. To illustrate, when the user looks away from eyepieces 212 and toward foot pedals 206 to position the user's foot on the correct foot pedal 206, user control system 200 may operate in the suspended operating mode and illuminate task lighting for foot pedals 206 to aid the user in correctly positioning the user's foot. Similarly, when a head of a user is detected to be present but eyes of the user are not detected to be gazing through an eyepiece and a hand of the user is not detected to be present, user control system 200 may operate in the suspended operating mode and illuminate task lighting for master controls 204 to aid the user in correctly locating and gripping master controls 204. As another example, the user control system may set the brightness of touchscreen display 218 so as to facilitate user interaction with touchscreen display 218.

During the suspended operating mode touchscreen display 218 may be configured to display visual content as may suit a particular implementation. For example, touchscreen display 218 may display supplemental visual content such as medical imaging, surgical team information, patient information, information associated with the surgical procedure, notifications or messages, instructional content, and the like.

Additionally, while operating in the suspended operating mode the user control system may be configured to allow adjustment of ergonomic adjustments of the user control system. In some examples the speed of ergonomic adjustments may be increased as compared with the speed of ergonomic adjustments made during the active operating mode.

While operating in the suspended operating mode the user control system may also be configured to seamlessly transition to operating in the active operating mode. For example, the user control system may be configured to switch to operating in the active operating mode without requiring-re-validation of the user, as will be explained below in more detail. Additionally or alternatively, the image display system of the user control system may continue presenting imagery generated by the surgical system (e.g., imagery of a surgical area associated with a patient) while operating in the suspended operating mode. Thus, transitioning to operating in the active operating mode does not require re-initiation of the image display system or any associated surgical instrument (e.g., an endoscope).

While operating in the inactive operating mode, the user control system may cease control of operations performed by the surgical system based on input provided by the user by way of the user control system. For instance, surgical instruments coupled to manipulator arms 112 may cease following movement of master controls 204 and responding to operation of foot pedals 206. The surgical instruments may remain static and/or inoperable even if the user attempts to manipulate master controls 204 or operate foot pedals 206. In some examples, master controls 204 may be locked so they cannot be moved or otherwise manipulated. Additionally, in some examples the image display system of the user control system may also cease presenting imagery generated by the surgical system.

In some examples, while operating in the inactive operating mode the user control system may additionally or alternatively be configured to apply a third configuration for the illumination system of the user control system. The third configuration may be different from the first and second configurations. For example, the user control system may set the illumination level of task lights for master controls 204 and foot pedals 206 to a third level (e.g., off) but turn on turn touchscreen display 218 and set a screen brightness to a minimum level until a user input operation is received by way of touchscreen display 218.

In additional examples, while operating in the inactive operating mode the user control system may be locked out from automatically switching to operating in the active operating mode or the suspended operating mode. For example, as will be explained below in more detail, switching from operating in the inactive operating mode to operating in the active operating mode and/or the suspended operating mode may be conditioned on successful validation (or re-validation) of the user of the user control system.

While the user control system has been described as being configured to operate in an active operating mode, a suspended operating mode, and an inactive operating mode, the user control system may be configured to operate in any additional operating modes. Other operating modes may be based at least in part on eye gaze information included in eye tracking data, hand presence information (e.g., whether a hand of a user is in physical contact with each master control 204), master control information (e.g., a position, pose, orientation, or state of master controls 204), and the like. For example, operating mode system 1000 may direct the user control system to operate in an additional suspended operating mode when a head of a user is present and an eye of the user is gazing through an eyepiece but a hand of the user is not present within a vicinity of master controls 204. In such operating mode the user control system may be configured to re-center master controls 204, e.g., reposition each master control 204 to an optimal position based on a location of surgical instruments within the imagery presented by image display system 208, Additionally or alternatively, the user control system may be configured to reposition each master control 204 to improve ergonomics (e.g., to reposition each master control 204 for easier access and control by a user) and/or to prevent collision with the other master control 204 or other components of the user control system (e.g., a system enclosure, armrest 214, etc.).

In some examples a computer-assisted surgical system (e.g., surgical system 100) may include multiple user control systems. For example, a first user control system may be used by a student to perform a surgical procedure, and a second user control system may be used by a proctor to monitor and assist with the surgical procedure. In such surgical systems, operating mode system 1000 may be configured to set the operating mode of the first user control system based on the state of the second user control system. For example, operating mode system 1000 may direct the first control system to operate in a suspended operating mode when eye tracking data generated by the second user control system indicates that an eye of the user of the second user control system is not gazing through an eyepiece included in the second user control system. In this way, when control of surgical instruments by the student may be suspended while the proctor is not viewing the imagery of the surgical area associated with the patient.

In some examples, operating mode system 1000 may implement a machine learning model configured to classify a state of a user of the user control system based on head presence data, eye tracking data, and/or hand presence data. The state of the user may then be used to select and set an operating mode of the user control system.

Figure 12:
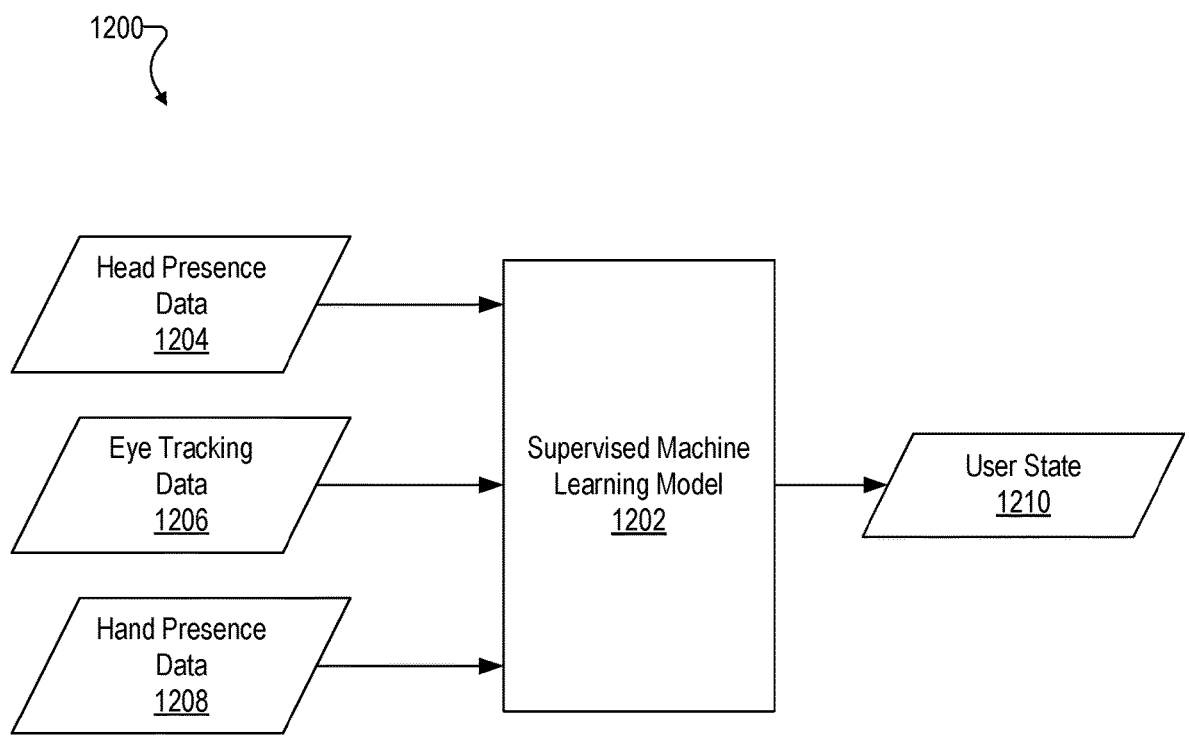
FIG. 12 illustrates an exemplary configuration in which a supervised machine learning model is maintained or otherwise accessed by the exemplary operating mode control system of FIG. 10 according to principles described herein.

FIG. 12 illustrates an exemplary configuration 1200 in which a supervised machine learning model 1202 is maintained or otherwise accessed by operating mode system 1000. Supervised machine learning model 1202 is supervised in that it is specifically trained with pre-classified data prior to being used by operating mode system 1000 to determine a state of a user of the user control system.

Supervised machine learning model 1202 may be maintained by operating mode system 1000 itself (e.g., by storage facility 1002). Alternatively, supervised machine learning model 1202 may be maintained by a system remote from operating mode system 1000 and accessed by way of a network.

As shown, supervised machine learning model 1202 receives head presence data 1204, eye tracking data 1206, and/or hand presence data 1208 as input. Head presence data 1204 may represent a real-time state of a head of a user (e.g., a presence, position, and/or proximity of a head of a user relative to a viewer console included in the user control system). Eye tracking data 1206 may represent a real-time state of one or more eyes of a user (e.g., a presence and/or direction of gaze of the eye(s)). Hand presence data 1208 may represent a real-time state of one or more hands of a user (e.g., a presence, position, proximity, and/or contact of the hand(s) relative to a master control device and/or another user input device).

Supervised machine learning model 1202 may analyze the head state, eye state, and hand state represented by head presence data 1204, eye tracking data 1206, and hand presence data 1208 in any suitable manner. For example, supervised machine learning model 1202 may analyze head presence data 1204, eye tracking data 1206, and hand presence data 1208 in accordance with one or more decision tree learning algorithms, association rule learning algorithms, artificial neural network learning algorithms, deep learning algorithms, bitmap algorithms, and/or any other suitable data analysis technique as may serve a particular implementation.

In some examples, supervised machine learning model 1202 is configured to classify a user state 1210 based on the head state, eye state, and hand state represented by head presence data 1204, eye tracking data 1206, and hand presence data 1208. The user state 1210 may be indicative of the user's intent to interact with the user control system. For the example, the user intent may be an intent to control surgical instruments by manipulating master controls 204, intent to adjust ergonomic settings of user control system 200, intent to temporarily pause interaction with user control system 200 to converse with other surgical team members, intent to review information provided by a touchscreen display (e.g., touchscreen display 218), intent to interact with foot pedals 206, intent to terminate interaction with user control system 200, and the like. Operating mode system 1000 may then set an appropriate operating mode of the user control system for the classified user state 1210.

Supervised machine learning model 1202 may be trained in any suitable manner. For example, supervised machine learning model 1202 may be trained by providing data representative of known user states and/or data representative of known transitions between user states as training inputs to supervised machine learning model 1202. Additionally or alternatively, supervised machine learning model 1202 may be trained based on historical changes in head presence data, eye tracking data, and hand presence data mapped to historical changes in user intent. The training may be performed prior to operating mode system 1000 using supervised machine learning model 1202 to classify a user state based on head presence data 1204, eye tracking data 1206, and hand presence data 1208.

Additionally or alternatively, supervised machine learning model 1202 may be trained while operating mode system 1000 is using supervised machine learning model 1202 to classify a user state. For example, in response to a user state classification for a particular combination of head state, eye state, and hand state, operating mode system 1000 may provide a notification to a user (e.g., to surgeon 110-1 or another surgical team member 110). The user may provide user input (e.g., by selecting an option included in the notification) confirming or refuting the user state classification. Operating mode system 1000 may receive the user input and provide the user input as a training input to supervised machine learning model 1202.

As mentioned, operating mode system 1000 may select, based on the accessed head presence data and/or the accessed eye tracking data, an operating mode from among various available operating modes and direct the user control system to operate in accordance with the selected operating mode.

Figure 13:
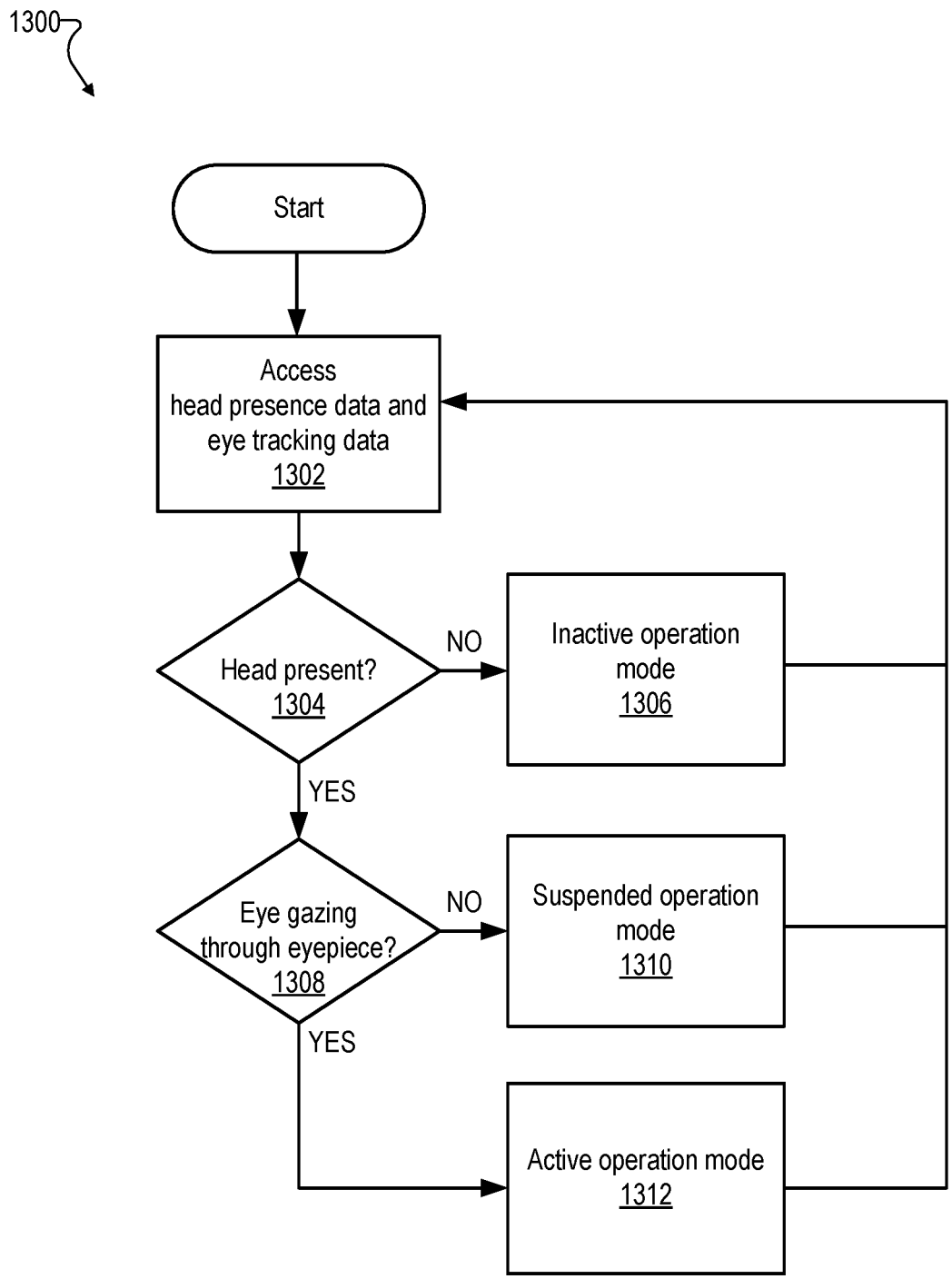
FIG. 13 illustrates an exemplary method of setting an operating mode for a user control system of a computer-assisted surgical system according to principles described herein.

FIG. 13 illustrates an exemplary method 1300 of setting an operating mode for a user control system of a computer-assisted surgical system. While FIG. 13 illustrates exemplary operations according to one embodiment, other embodiments may omit, add to, reorder, and/or modify any of the operations shown in FIG. 13.

In operation 1302, operating mode system 1000 accesses head presence data and eye tracking data.

In operation 1304, operating mode system 1000 determines whether the head presence data indicates a presence of a head of a user within a vicinity of a viewer console of the user control system or indicates an absence of a head of a user within the vicinity of the viewer console. If the head presence data indicates an absence of a head of a user within the vicinity of the viewer console, operating mode system 1000 proceeds to operation 1306. In operation 1306, operating mode system 1000 directs the user control system to operate in accordance with an inactive operating mode, and processing then returns to operation 1302. However, if the head presence data indicates a presence of a head of a user within the vicinity of the viewer console, operating mode system 1000 proceeds to operation 1308.

In operation 1308, operating mode system 1000 determines whether the eye tracking data indicates that an eye of the user is gazing through an eyepiece included in the user control system or indicates that an eye of the user is not gazing through the eyepiece. If the eye tracking data indicates that an eye of the user is not gazing through the eyepiece, operating mode system 1000 proceeds to operation 1310. In operation 1310, operating mode system 1000 directs the user control system to operate in accordance with a suspended operating mode, and processing then returns to operation 1302. However, if the eye tracking data indicates that an eye of the user is gazing through the eyepiece, operating mode system 1000 proceeds to operation 1312.

In operation 1312, operating mode system 1000 directs the user control system to operate in accordance with an active operating mode, and processing then returns to operation 1302.

Figure 14:
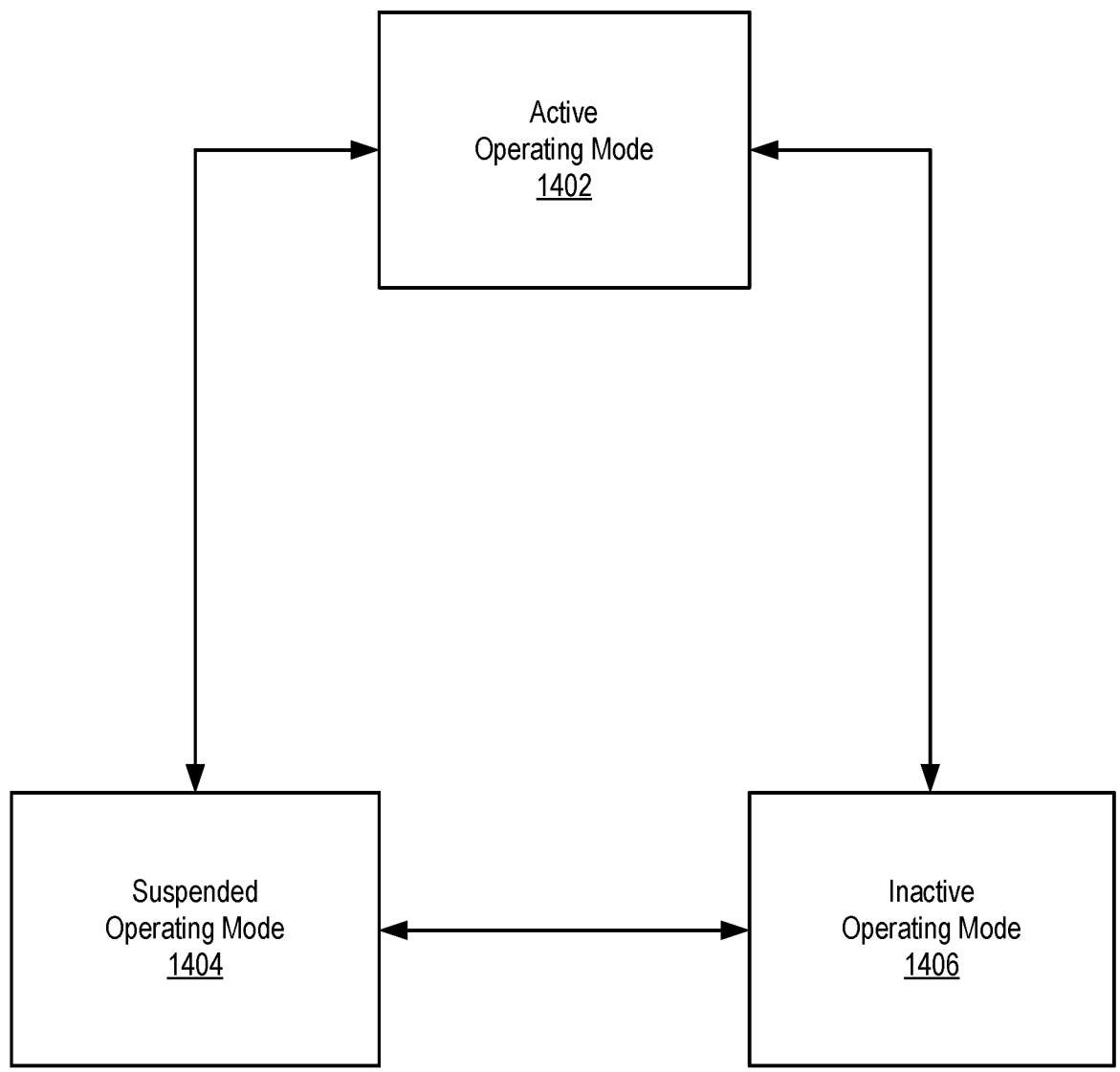
FIGS. 14-19 illustrate exemplary manners in which a user control system of a computer-assisted surgical system may switch operating modes according to principles described herein.

If the head presence data and/or eye tracking data changes while the user control system is operating in a particular operating mode, operating mode system 1000 may direct the user control system to switch operating modes. FIG. 14 illustrates an exemplary manner in which the user control system may switch operating modes. As shown, the user control system may operate in an active operating mode 1402, a suspended operating mode 1404, and an inactive operating mode 1406. The user control system may switch between any two operating modes based on a change in the head presence data, the eye tracking data, and/or the hand presence data.

For example, while the user control system is operating in active operating mode 1402, a user of the user control system may look down at touchscreen display 218 to see which surgical team members have logged in to surgical system 100. Accordingly, operating mode system 1000 may detect that the head presence data remains the same (the head remains present) but that the eye tracking data switches from indicating that the eye of the user is gazing through the eyepiece to indicating that the eye of the user is not gazing through the eyepiece. In response to the change in eye tracking data, operating mode system 1000 may direct the user control system to switch from operating in active operating mode 1402 to operating in suspended operating mode 1404. In suspended operating mode 1404, a brightness of touchscreen display 218 may be increased as compared with the brightness in active operating mode 1402.

While the user control system is operating in suspended operating mode 1404, operating mode system 1000 may detect that, while the head presence data remains unchanged, the eye tracking data switches from indicating that the eye of the user is not gazing through the eyepiece to indicating that the eye of the user is gazing through the eyepiece. For example, the user may return to looking into eyepieces 212 to view imagery presented by image display system 208. In response to the change in eye tracking data, operating mode system 1000 may direct the user control system to transition from operating in suspended operating mode 1404 to operating in active operating mode 1402.

While user control system is operating in active operating mode 1402 or suspended operating mode 1404, operating mode system 1000 may detect that the head presence data switches from indicating that the head of the user is present within the vicinity of the viewer console to indicating that the head of the user is absent within the vicinity of the viewer console. For example, the user may leave the user control system to talk to the new surgical team member. In response to the change in the head presence data, operating mode system 1000 may direct the user control system to switch from operating in active operating mode 1402 or suspended operating mode 1404 to operating in inactive operating mode 1406. In inactive operating mode 1406, control of surgical instruments by the user control system is terminated, presentation of imagery by the image display system is terminated, and system illumination of the user control system may be set to a standby level.

While user control system is operating in inactive operating mode 1406, operating mode system 1000 may detect that the head presence data switches from indicating that the head of the user is absent within the vicinity of the viewer console to indicating that the head of the user is present within the vicinity of the viewer console. For example, the user may return to the user control system to recommence the surgical procedure. In response to the change in the head presence data, operating mode system 1000 may direct the user control system to switch from operating in inactive operating mode 1406 to operating in active operating mode 1402 or suspended operating mode 1404, in accordance with an eye state.

In some examples, the user control system may switch between any two operating modes only if a change in the head presence data and/or the eye tracking data persists for a predetermined time period. For example, the user control system may switch from operating in inactive operating mode 1406 to operating in active operating mode 1402 or suspended operating mode 1404 only after the head presence data indicates that the head of the user is present within the vicinity of the viewer console for at least a predetermined time period (e.g., 5 seconds). As another example, the user control system may switch from operating in suspended operating mode 1404 to operating in active operating mode 1402 only after the eye tracking data indicates that the eye of the user is gazing through the eyepiece for at least another predetermined time period (e.g., 3 seconds).

In some examples, operating mode system 1000 may use eye tracking data to determine head presence. As explained above, the presence or absence of a head of a user may be inferred from the presence or absence and/or gaze direction of an eye of the user. For example, while the user control system is operating in inactive operating mode 1406, operating mode system 1000 may detect that the eye tracking data switches from indicating that the eye of the user is not gazing through the eyepiece to indicating that the eye of the user is gazing through the eyepiece and thereby determine that a head of a user is present within the vicinity of the viewer console. In response to the change in the eye tracking data, operating mode system 1000 may direct the user control system to switch from operating in inactive operating mode 1406 to operating in active operating mode 1402.

In some examples, operating mode system 1000 may require head presence data to validate an initial head presence determination (e.g., when switching from operating in inactive operating mode 1406 to operating in active operating mode 1402), Once head presence has been successfully determined and validated based on both eye tracking data and head presence data, operating mode system 1000 may determine head presence based only on eye tracking data such that a change in head presence data does not result in a change in the head presence state. In this way, operating mode system 1000 may prevent undesired changes in operating mode and interruption of control due to false negative determinations of loss of head presence based on head presence data. Such false negatives may arise, for example when the user slightly relaxes his or her head position in the viewer console while still looking into the eyepieces, or when hair or skin color result in a loss of head presence.

Figure 15:
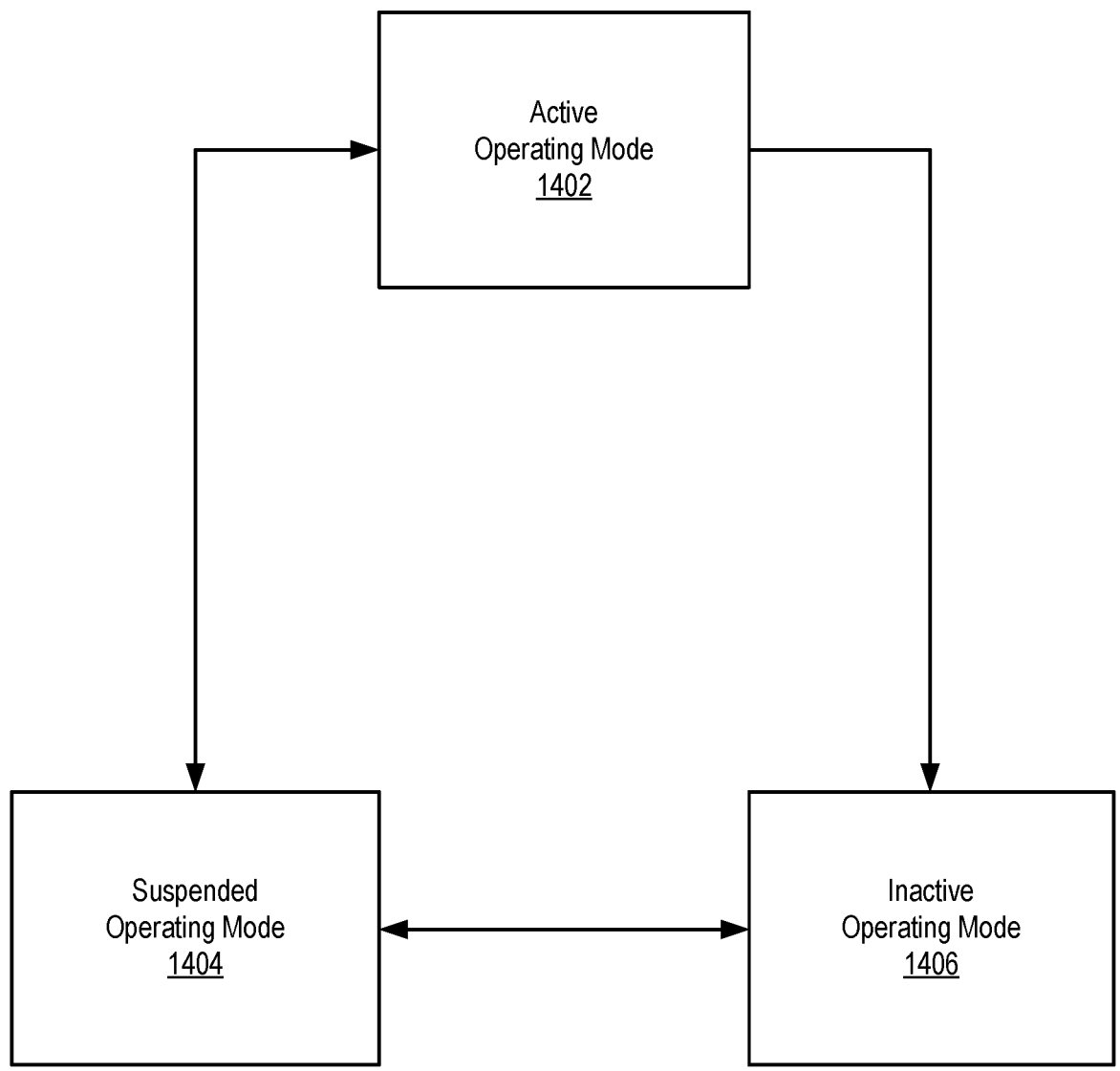

In some examples, as shown in FIG. 15, the user control system may switch from operating in inactive operating mode 1406 to operating in active operating mode 1402 only after first switching to operating in suspended operating mode 1404. In some examples, the user control system must operate in the suspended operating mode 1404 for at least a predetermined period of time before it may switch to operating in active operating mode 1402. In this way, operation in active operating mode 1402 may be delayed until the user has had a sufficient amount of time to become situated with the user control system while the user control system is operating in suspended operating mode 1404. For example, while in the suspended operating mode the user may adjust settings of user control system (e.g., ergonomic position settings, etc.) and interact with touchscreen display 218 to view information about surgical team members currently logged in to surgical system 100.

Figure 16:
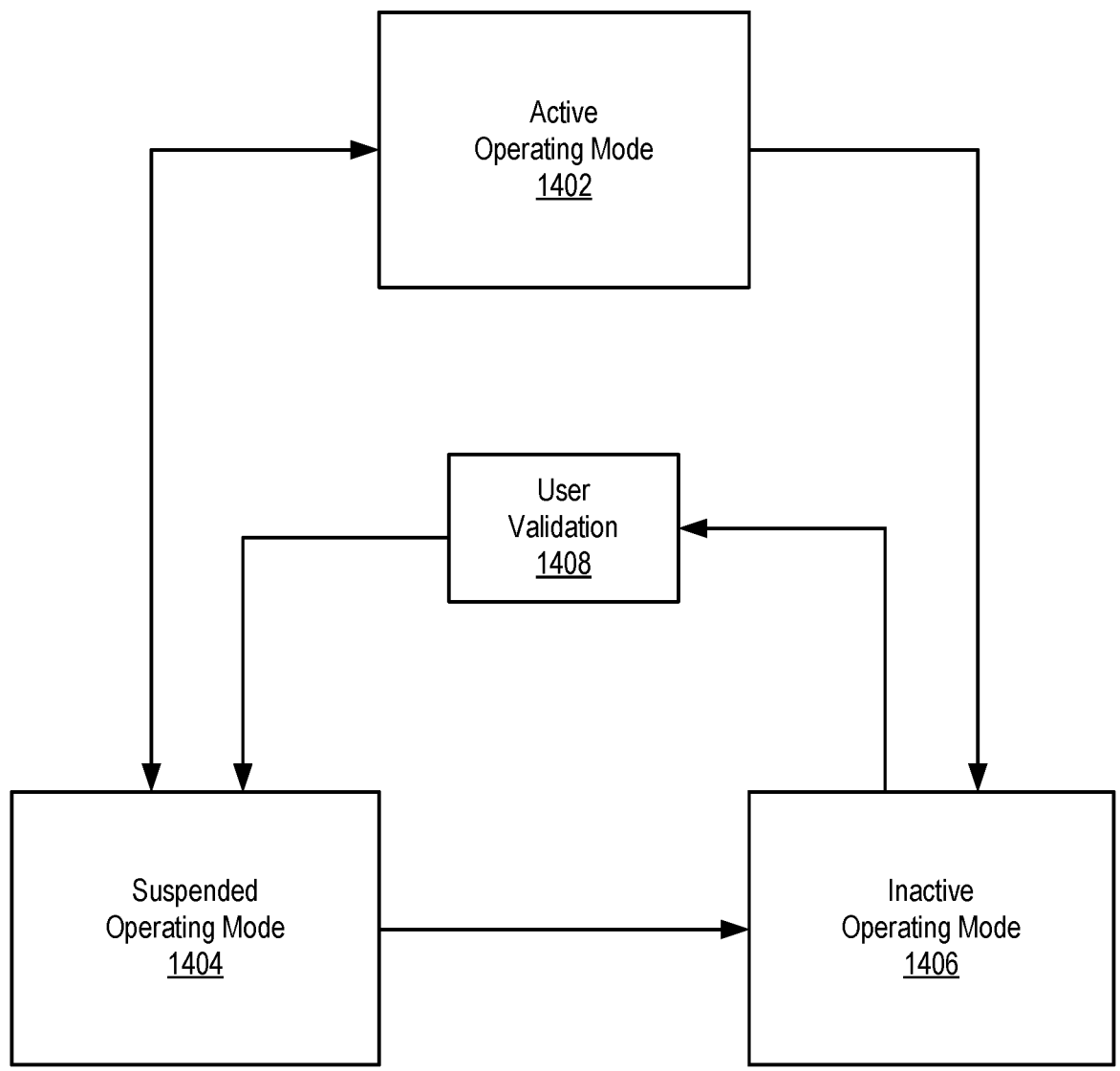

In some examples, a user must be validated prior to the user control system switching from operating in inactive operating mode 1406 to operating in active operating mode 1402 and/or suspended operating mode 1404. FIG. 16 illustrates an exemplary manner of implementing user validation to switch operating modes. FIG. 16 is similar to FIG. 15, except that the user control system may only switch from operating in inactive operating mode 1406 to operating in suspended operating mode 1404 upon a successful validation 1208 of the user of the user control system. As explained above, user validation 1208 may include receiving a deliberate user input provided by way of a master control and/or authentication of the user. For example, in response to a change in head presence data while the user control system is operating in inactive operating mode 1406, touchscreen display 218 may present a user login interface by which the user may provide user authentication information (e.g., login name and password). Upon successful authentication of the information provided by the user, the user control system may switch to operating in suspended operating mode 1404. As another example, while the user control system is operating in inactive operating mode 1406, a user may make a deliberate gesture (movement) via master controls 204. In response to this deliberate gesture, the user control system may switch to operating in suspended operating mode 1404. In some examples, switching to operating in suspended operating mode 1404 from inactive operating mode 1406 may also be conditioned on a determination that a head of the user is present.

As shown in FIG. 16, the user control system may switch from operating in suspended operating mode 1404 to operating in active operating mode 1402 without further user validation 1208. For example, while operating in suspended operating mode 1404, the user control system may keep the user logged in, thereby enabling user interaction with certain features of the user control system 200. In this way, operating mode system 1000 may direct the user control system to seamlessly transition from suspended operating mode 1404 to active operating mode 1402 while the head of the user is present within a vicinity of a viewer console of the user control system.

Figure 17:
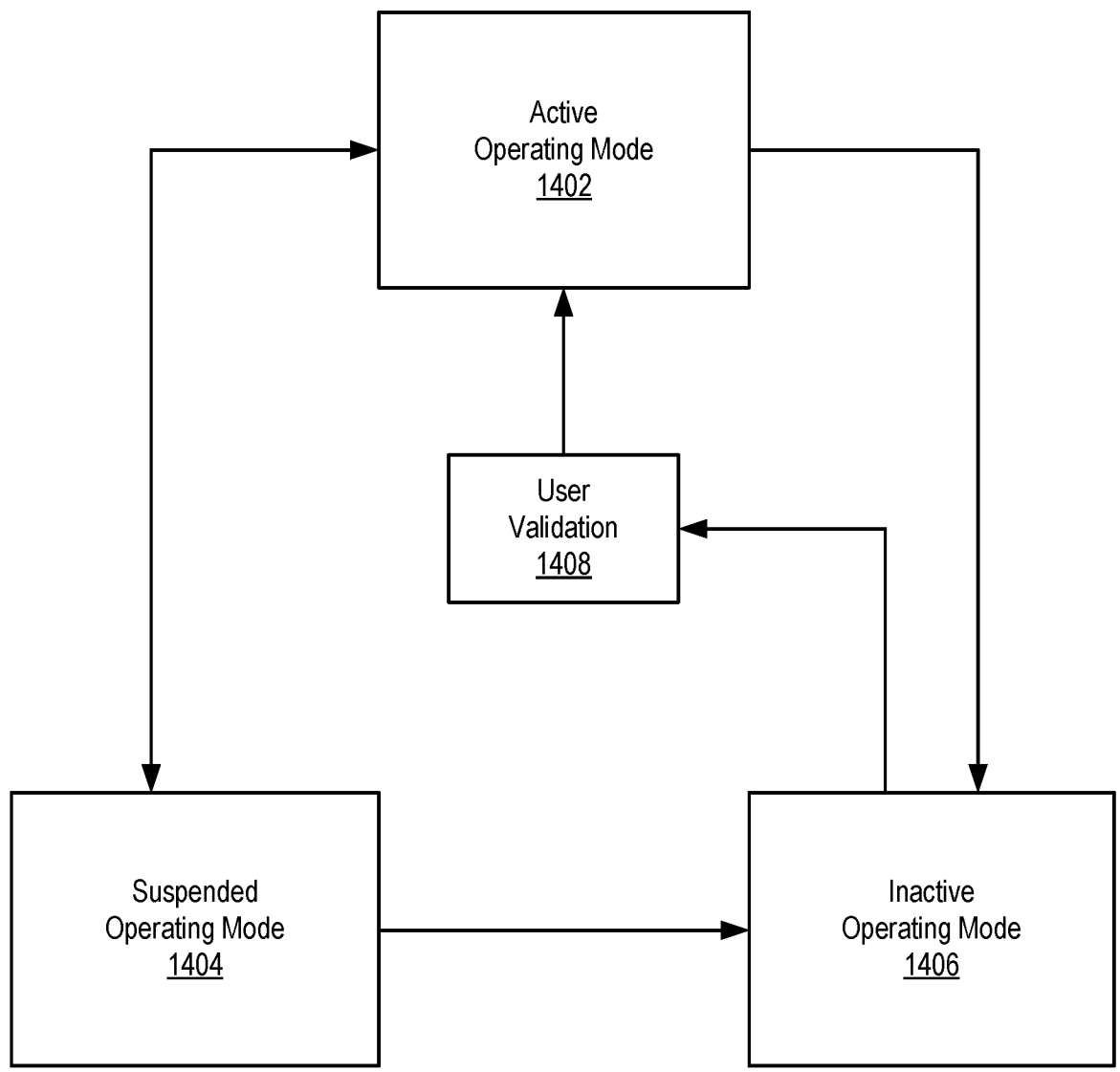

FIG. 17 illustrates another exemplary manner of implementing user validation to switch operating modes. FIG. 17 is similar to FIG. 15, except that the user control system may switch from operating in inactive operating mode 1406 to operating in active operating mode 1402 only with successful validation 1208 of the user of the user control system. In addition, the user control system is not configured to switch from operating in inactive operating mode 1406 to operating in suspended operating mode 1404, thereby ensuring that the user control system operates in active operating mode 1402 only with successful user validation 1208. However, the user control system may switch from operating in suspended operating mode 1404 to operating in active operating mode 1402 without user validation 1208. In this way, the user control system may seamlessly transition between active operating mode 1402 and suspended operating mode 1404 while the head of the user is in a present state.

Figure 18:
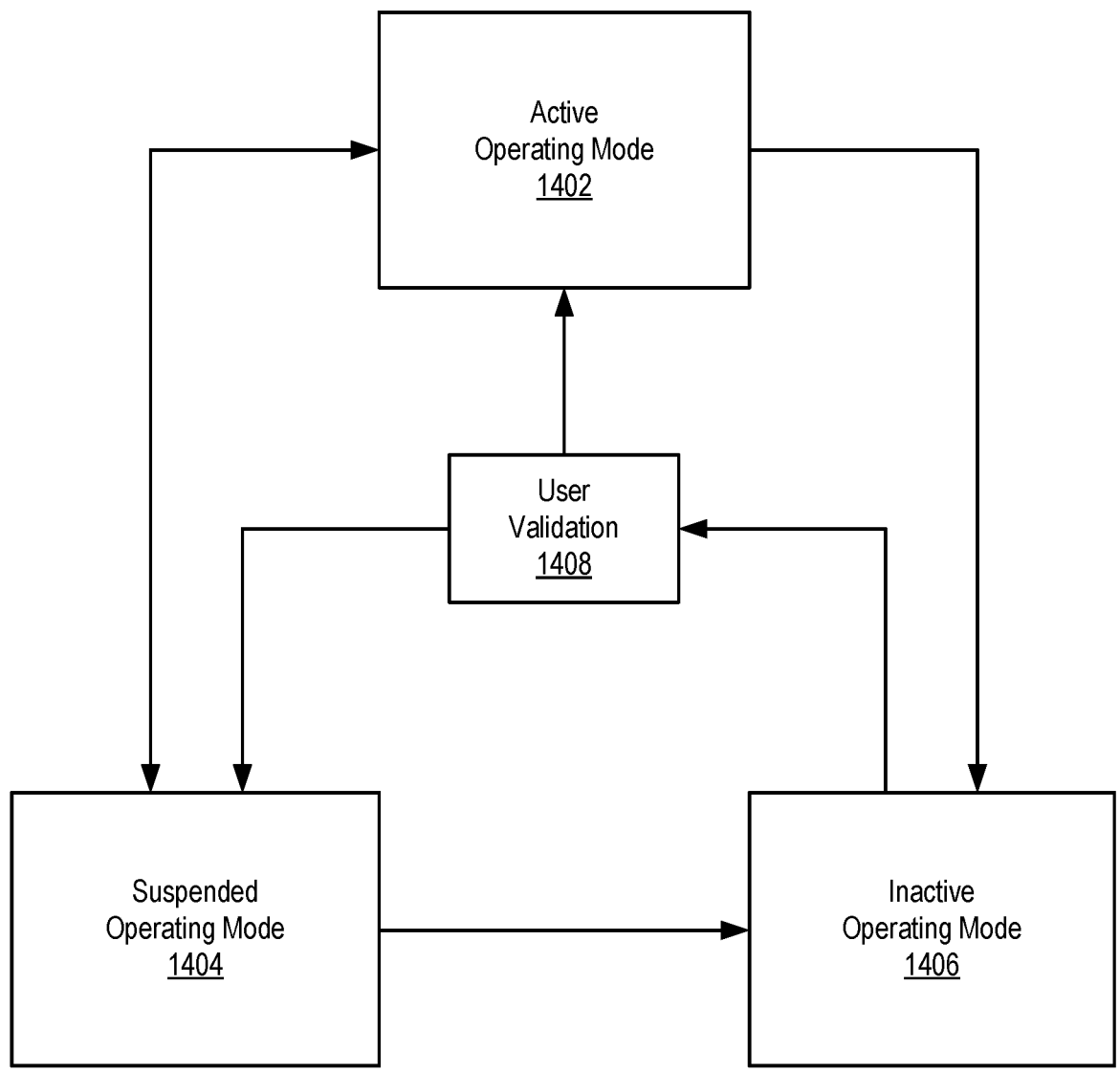

FIG. 18 illustrates another exemplary manner of implementing user validation to switch operating modes. FIG. 18 is similar to FIGS. 16 and 17, except that the user control system may switch from operating in inactive operating mode 1406 to operating in either active operating mode 1402 or suspended operating mode 1404 only with successful validation 1208 of the user of the user control system. However, the user control system may switch from operating in suspended operating mode 1404 to operating in active operating mode 1402 without user validation 1208, thereby facilitating a seamless transition from suspended operating mode 1404 to active operating mode 1402.

Figure 19:
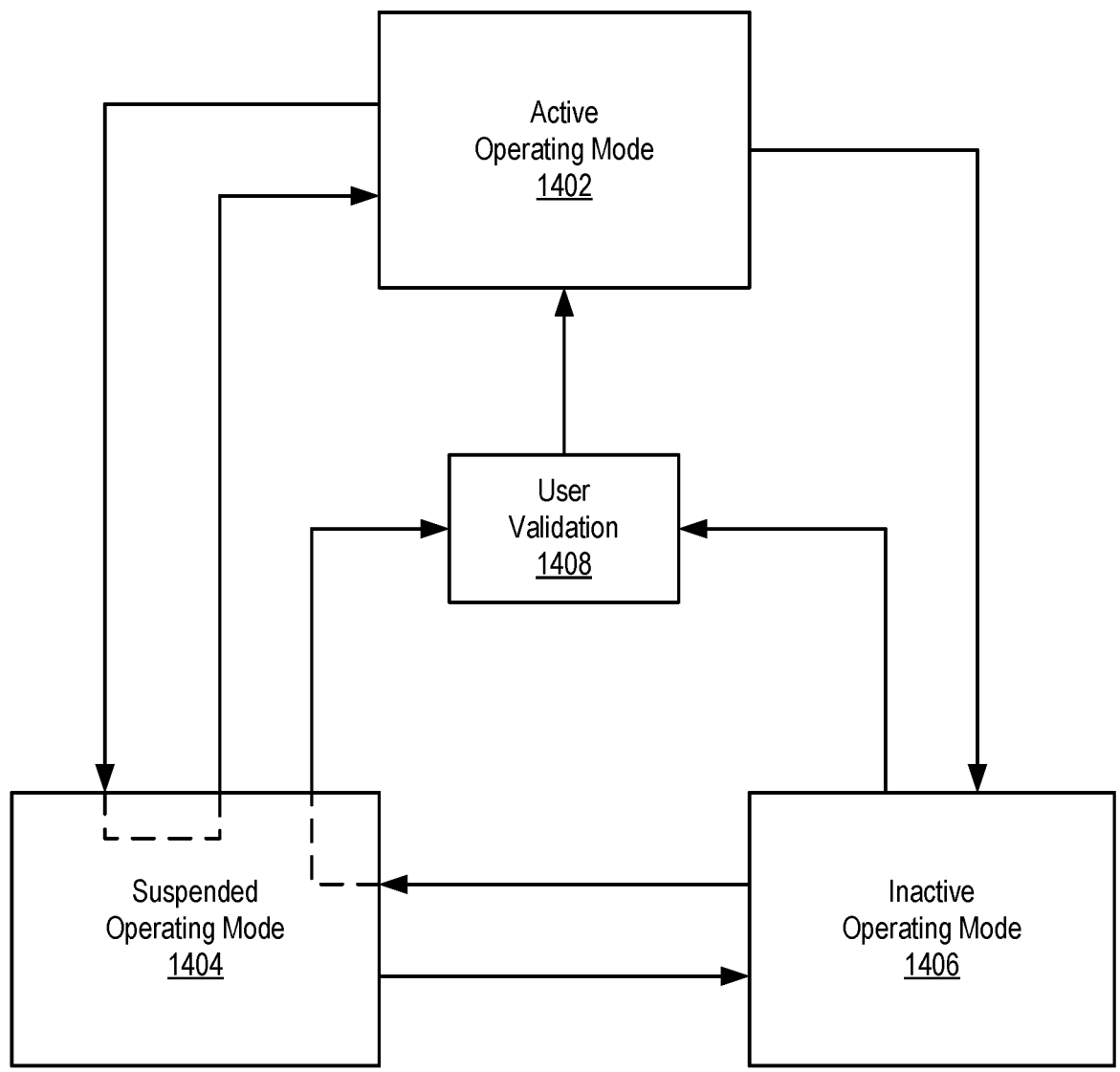

FIG. 19 illustrates another exemplary manner of implementing user validation to switch operating modes. As shown, the user control system may switch from operating in inactive operating mode 1406 to operating in active operating mode 1402 (either directly or by way of suspended operating mode 1404) only with successful user validation 1208. Additionally, if the user control system entered suspended operating mode 1404 directly from inactive operating mode 1406, then the user control system may switch from operating in suspended operating mode 1404 to operating in active operating mode 1402 only with successful validation 1208 of the user. However, if the user control system entered suspended operating mode 1404 from active operating mode 1402, then the user control system may switch from operating in suspended operating mode 1404 to operating in active operating mode 1402 without user validation 1208. With this configuration, the user control system may enter active operating mode 1402 only after successful user validation 1208, but after user validation 1208 the user control system may seamlessly transition from suspended operating mode 1404 to active operating mode 1402 while the head of the user is present.

While operating in the suspended operating mode, the user control system may also keep the user logged in (or may automatically re-authenticate the user), thereby enabling user interaction with certain features of user control system 200. For example, the user may adjust settings of user control system (e.g., ergonomic position settings, etc.) or interact with touchscreen display 218 to view information about surgical team members 110 currently logged in to surgical system 100.

In any of the examples described above, the operating mode may be set based on hand presence data and/or master control data indicative of a position, pose, or orientation of master controls (e.g., master controls 204) in addition to head presence data and/or eye tracking data. For example, the user control system may switch from operating in suspended operating mode 1404 to operating in active operating mode 1402 only if hand presence data indicates that a hand of a user is present within a vicinity of master controls (e.g., master controls 204) of the user control system. In another example, the user control system may switch from operating in active operating mode 1402 to operating in suspended operating mode 1404 when head presence and eye presence (or eye gaze through eyepieces) are lost so long as hand presence persists. For example, if the user moves his or her head and eyes away from viewer console 500 in order to converse with another surgical team member but keeps his or her hands in physical contact with master control 204, the user control system would switch to operate in suspended operating mode 1404 instead of switching to operating in inactive operating mode 1406. If, however, the user also removes his or her hand from master controls 204 such that hand presence is also lost, the user control system would switch to operating in inactive operating mode 1406.

As a further example, the user control system may switch to operating in active operating mode 1402 only if a state (e.g., a position, pose, orientation, etc.) of the set of master controls matches a state (e.g., a position, pose, orientation, etc.) of the surgical instrument. To illustrate, while user control system 200 is operating in active operating mode 1402, the user may manipulate (e.g., pinch) left master control 204-L to close a stapling instrument on tissue to be stapled. While the stapling instrument is closed on the tissue, the user may look down at foot pedals 206 to locate the appropriate foot pedal 206 to fire the stapling instrument. While the user is looking down, user control system 200 may switch to operating in suspended operating mode 1404. While in suspended operating mode 1404, the stapling instrument cannot move but remains in a closed position on the tissue to be stapled. After locating the appropriate foot pedal 206, the user may then return to looking into eyepieces 212 to view the imagery of the surgical area. If the master control data indicates that the user's hand is not in physical contact with left master control 204-L, the user control system does not switch to operating in active operating mode 1402 until the master control data indicates that the user's hand is in physical contact with left master control 204-L. In additional examples, the user control system does not switch to operating in active operating mode 1402 until the master control data indicates that a state of left master control 204-L matches a state of the stapling instrument (e.g., left master control 204-L is in a closed state).

Figure 20:
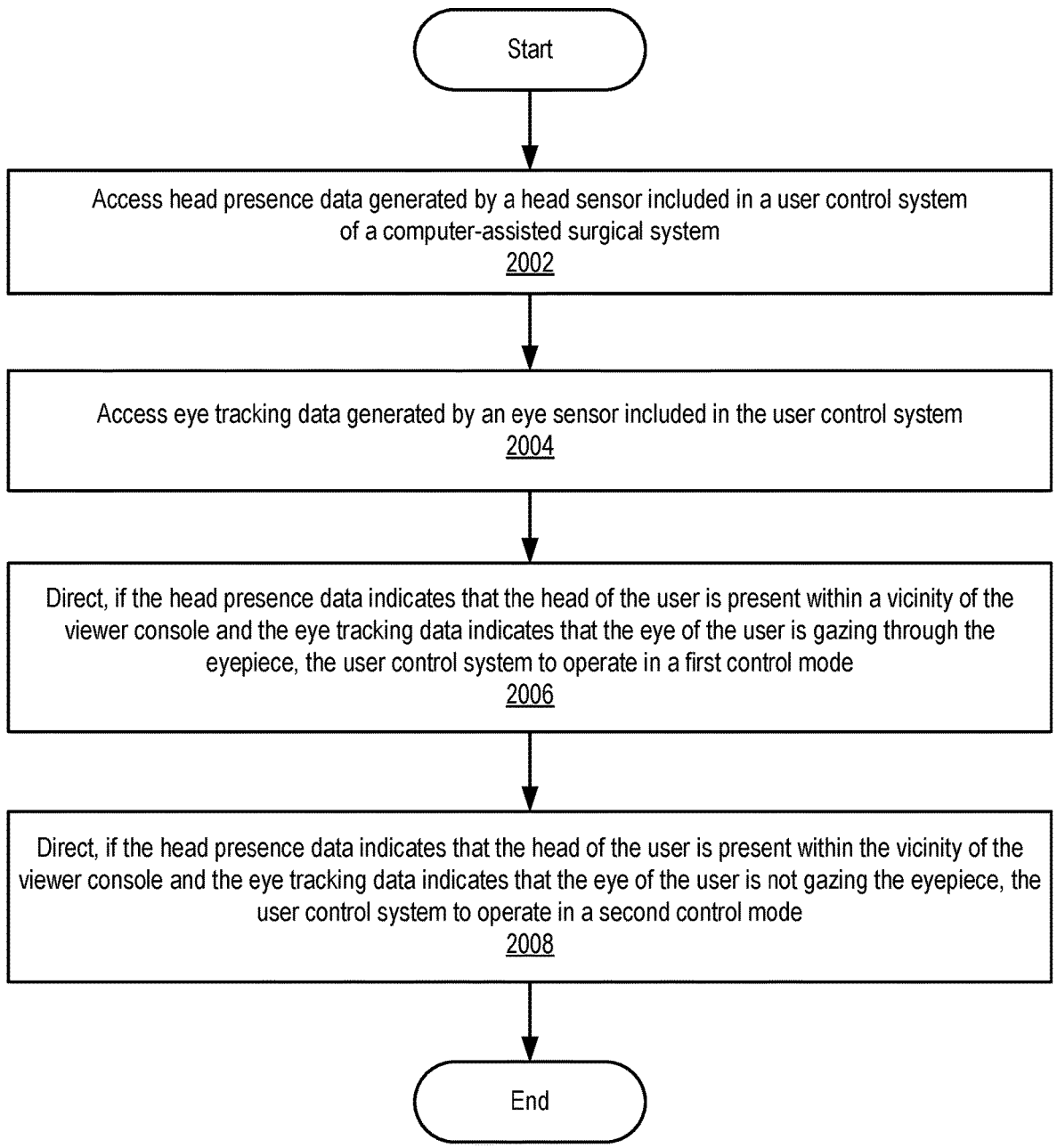
FIG. 20 illustrates another method of setting an operating mode for a user control system of a computer-assisted surgical system according to principles described herein.

FIG. 20 illustrates an exemplary method 2000 of setting an operating mode for a user control system of a computer-assisted surgical system. While FIG. 20 illustrates exemplary operations according to one embodiment, other embodiments may omit, add to, reorder, and/or modify any of the operations shown in FIG. 20. One or more of the operations shown in FIG. 20 may be performed by operating mode system 1000, any components included therein, and/or any implementation thereof.

In operation 2002, an operating mode control system accesses head presence data generated by a head sensor included in a user control system of a computer-assisted surgical system. The head presence data indicates a presence or an absence of a head of a user within a vicinity of a viewer console included in the user control system. Operation 2002 may be performed in any of the ways described herein.

In operation 2004, the operating mode control system accesses eye tracking data generated by an eye sensor included in the user control system. The eye tracking data indicates whether an eye of a user is gazing through an eyepiece included in the user control system. Operation 2004 may be performed in any of the ways described herein.

In operation 2006, the operating mode control system directs, if the head presence data indicates that the head of the user is present within a vicinity of the viewer console and the eye tracking data indicates that the eye of the user is gazing through the eyepiece, the user control system to operate in a first operating mode (e.g., an active operating mode). Operation 2006 may be performed in any of the ways described herein.

In operation 2008, the operating mode control system directs, if the head presence data indicates that the head of the user is present within the vicinity of the viewer console and the eye tracking data indicates that the eye of the user is not gazing through the eyepiece, the user control system to operate in a second operating mode (e.g., a suspended operating mode) different from the first operating mode. Operation 2008 may be performed in any of the ways described herein.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g. a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

Figure 21:
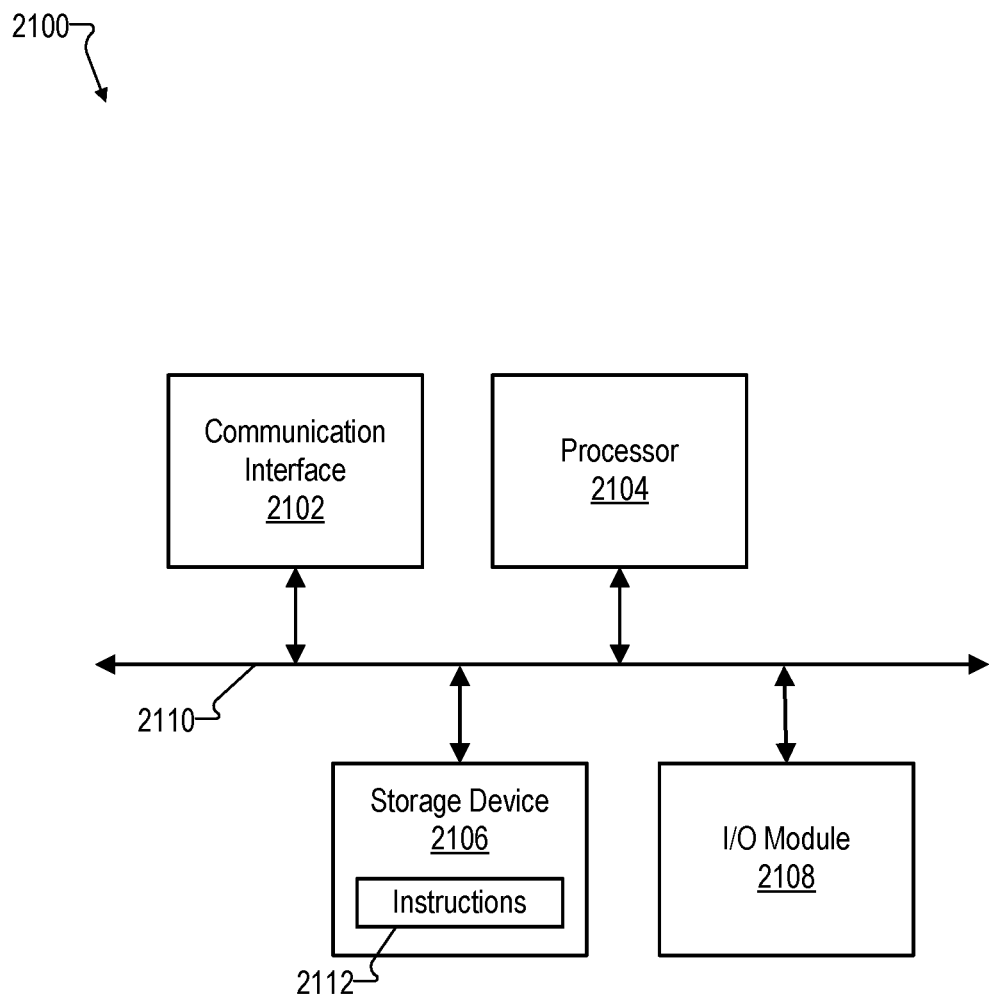
FIG. 21 illustrates an exemplary computing system according to principles described herein.

FIG. 21 illustrates an exemplary computing device 2100 that may be specifically configured to perform one or more of the processes described herein. As shown in FIG. 21, computing device 2100 may include a communication interface 2102, a processor 2104, a storage device 2106, and an input/output ("I/O") module 2108 communicatively connected one to another via a communication infrastructure 2110. While an exemplary computing device 2100 is shown in FIG. 21, the components illustrated in FIG. 21 are not intended to be limiting. Additional or alternative components may be used in other embodiments. Components of computing device 2100 shown in FIG. 21 will now be described in additional detail.

Communication interface 2102 may be configured to communicate with one or more computing devices. Examples of communication interface 2102 include, without limitation, a wired network interface (such as a network interface card), a wireless network interface (such as a wireless network interface card), a modem, an audio/video connection, and any other suitable interface.

Processor 2104 generally represents any type or form of processing unit capable of processing data and/or interpreting, executing, and/or directing execution of one or more of the instructions, processes, and/or operations described herein. Processor 2104 may perform operations by executing computer-executable instructions 2112 (e.g., an application, software, code, and/or other executable data instance) stored in storage device 2106.

Storage device 2106 may include one or more data storage media, devices, or configurations and may employ any type, form, and combination of data storage media and/or device. For example, storage device 2106 may include, but is not limited to, any combination of the non-volatile media and/or volatile media described herein. Electronic data, including data described herein, may be temporarily and/or permanently stored in storage device 2106. For example, data representative of computer-executable instructions 2112 configured to direct processor 2104 to perform any of the operations described herein may be stored within storage device 2106. In some examples, data may be arranged in one or more databases residing within storage device 2106.

I/O module 2108 may include one or more I/O modules configured to receive user input and provide user output. One or more I/O modules may be used to receive input for a single virtual experience. I/O module 2108 may include any hardware, firmware, software, or combination thereof supportive of input and output capabilities. For example, I/O module 2108 may include hardware and/or software for capturing user input, including, but not limited to, a keyboard or keypad, a touchscreen component (e.g., touchscreen display), a receiver (e.g., an RF or IR receiver), motion sensors, and/or one or more input buttons.

I/O module 2108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 2108 is configured to provide graphical data to a display for presentation to a user. The graphical data may be representative of one or more graphical user interfaces and/or any other graphical content as may serve a particular implementation.

In some examples, any of the systems, computing devices, and/or other components described herein may be implemented by computing device 2100. For example, processing facility 1004 may be implemented by processor 2104 and storage facility 1002 may be implemented by storage device 2106.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A system comprising:
    a memory storing instructions; and
    a processor communicatively coupled to the memory and configured to execute the instructions to:
        access head presence data generated by a head sensor included in a user control system of a computer-assisted surgical system, the head presence data indicating a presence or an absence of a head of a user within a vicinity of a viewer console included in the user control system;
        access eye tracking data generated by an eye sensor included in the user control system, the eye tracking data indicating whether an eye of the user is gazing at a display device included in the user control system;
        direct, if the head presence data indicates that the head of the user is present within a vicinity of the viewer console and the eye tracking data indicates that the eye of the user is gazing at the display device, the user control system to operate in a first operating mode;
        direct, if the head presence data indicates that the head of the user is present within the vicinity of the viewer console and the eye tracking data indicates that the eye of the user is not gazing at the display device, the user control system to operate in a second operating mode different from the first operating mode;
        direct, if the head presence data indicates that the head of the user is absent from the vicinity of the viewer console, the user control system to operate in a third operating mode different from the first operating mode and the second operating mode; and
        direct, if user authentication data received while operating in the third operating mode indicates that the user is authorized to operate the computer-assisted surgical system, the user control system to switch from operating in the third operating mode to operating in the second operating mode, wherein:
            the first operating mode is an active mode, the second operating mode is a suspended mode, and the third operating mode is an inactive mode, and while operating in the second operating mode the user control system is configured to suspend control of operations performed by the computer-assisted surgical system based on input provided by the user by way of the user control system.

2. The system of claim 1, wherein while operating in the first operating mode the user control system is configured to control operations performed by the computer-assisted surgical system based on input provided by the user by way of the user control system.

3. The system of claim 2, wherein:
    the computer-assisted surgical system comprises a manipulator arm configured to be coupled to a surgical instrument; and
    the operations performed by the computer-assisted surgical system include operations performed by at least one of the manipulator arm and the surgical instrument.

4. The system of claim 1, wherein while operating in the second operating mode the user control system is configured to increase illumination of a user input device included in the user control system.

5. The system of claim 4, wherein the user input device includes a set of master controls configured to be manipulated by a hand of the user to control a surgical instrument included in the computer-assisted surgical system.

6. The system of claim 1, wherein while operating in the first operating mode the user control system is configured to present, to the user by way of the display device, imagery captured by an imaging device included in the computer-assisted surgical system.

7. The system of claim 6, wherein while operating in the second operating mode the user control system is configured to present supplemental content concurrently with the presentation of the imagery to the user.

8. The system of claim 7, wherein the user control system is configured to present the supplemental content by way of the display device.

9. The system of claim 1, wherein the head presence data indicates that the head of the user is present within the vicinity of the viewer console when the head of the user is detected by the head sensor to be located within a predetermined distance of the viewer console.

10. The system of claim 1, wherein the head sensor comprises a time-of-flight sensor.

11. The system of claim 1, wherein the processor is further configured to execute the instructions to:
    detect, while the user control system is operating in the first operating mode, that the eye tracking data switches from indicating that the eye of the user is gazing at the display device to indicating that the eye of the user is not gazing at the display device; and
    direct, in response to the detection that the eye tracking data switches from indicating that the eye of the user is gazing at the display device to indicating that the eye of the user is not gazing at the display device, the user control system to switch from operating in the first operating mode to operating in the second operating mode.

12. The system of claim 1, wherein the processor is further configured to execute the instructions to:
    detect, while the user control system is operating in the second operating mode, that the eye tracking data switches from indicating that the eye of the user is not gazing at the display device to indicating that the eye of the user is gazing at the display device; and
    direct, in response to the detection that the eye tracking data switches from indicating that the eye of the user is not gazing at the display device to indicating that the eye of the user is gazing at the display device, the user control system to switch from operating in the second operating mode to operating in the first operating mode.

13. The system of claim 12, wherein the directing of the user control system to switch from operating in the second operating mode to operating in the first operating mode is performed without user validation.

14. The system of claim 12, wherein:
the computer-assisted surgical system includes a manipulator arm configured to be coupled to a surgical instrument;
the user control system includes a set of master controls configured to be manipulated by a hand of the user to control the surgical instrument; and
the directing of the user control system to switch from operating in the second operating mode to operating in the first operating mode is performed further in response to a detection of the hand of the user being present within a vicinity of the set of master controls.

15. The system of claim 14, wherein the switching by the user control system from operating in the second operating mode to operating in the first operating mode is performed further in response to a detection that a state of the set of master controls matches a state of the surgical instrument.

16. The system of claim 1, wherein while operating in the third operating mode the user control system is configured to suspend control of operations performed by the computer-assisted surgical system based on input provided by the user by way of the user control system and lockout the user control system from automatically switching to operating in the first operating mode or the second operating mode.

17. The system of claim 1, wherein the instructions, when executed, are further configured to:
direct, if the user authentication data indicates that the user is not authorized to operate the computer-assisted surgical system, the user control system to operate in the third operating mode.

18. The system of claim 1, wherein the instructions, when executed, are further configured to:
while operating in the second operating mode, direct the user control system to switch from operating in the second operating mode to operating in the first operating mode without user authentication.

19. A system comprising:
a head sensor configured to detect a presence or an absence of a head of a user within a vicinity of a viewer console included in a user control system of a computer-assisted surgical system and generate head presence data indicating the presence or the absence of the head of the user within the vicinity of the viewer console;
an eye sensor configured to detect whether an eye of the user is gazing at a display device included in the user control system and generate eye tracking data indicating whether the eye of the user is gazing at the display device;
a memory storing instructions; and
a processor communicatively coupled to the memory and configured to execute instructions to:
access the head presence data and the eye tracking data;
direct, if the head presence data indicates that the head of the user is present within the vicinity of the viewer console and the eye tracking data indicates that the eye of the user is gazing at the display device, the user control system to operate in a first operating mode;
direct, if the head presence data indicates that the head of the user is present within the vicinity of the viewer console and the eye tracking data indicates that the eye of the user is not gazing at the display device, the user control system to operate in a second operating mode different from the first operating mode;
direct, if the head presence data indicates that the head of the user is absent from the vicinity of the viewer console, the user control system to operate in a third operating mode different from the first operating mode and the second operating mode; and
direct, if user authentication data received while operating in the third operating mode indicates that the user is authorized to operate the computer-assisted surgical system, the user control system to switch from operating in the third operating mode to operating in the second operating mode, wherein:
the first operating mode is an active mode, the second operating mode is a suspended mode, and the third operating mode is an inactive mode, and
while operating in the second operating mode the user control system is configured to suspend control of operations performed by the computer-assisted surgical system based on input provided by the user by way of the user control system.

20. A method comprising:
accessing head presence data generated by a head sensor included in a user control system of a computer-assisted surgical system, the head presence data indicating a presence or an absence of a head of a user within a vicinity of a viewer console included in the user control system;
accessing eye tracking data generated by an eye sensor included in the user control system, the eye tracking data indicating whether an eye of a user is gazing at a display device included in the user control system;
directing, in response to a determination that the head presence data indicates that the head of the user is present within the vicinity of the viewer console and the eye tracking data indicates that the eye of the user is gazing at the display device, the user control system to operate in a first operating mode;
directing, in response to a determination that the head presence data indicates that the head of the user is present within the vicinity of the viewer console and the eye tracking data indicates that the eye of the user is not gazing at the display device, the user control system to operate in a second operating mode different from the first operating mode;
directing, in response to a determination that the head presence data indicates that the head of the user is absent from the vicinity of the viewer console, the user control system to operate in a third operating mode different from the first operating mode and the second operating mode;
and directing, in response to receiving, while operating in the third operating mode, user authentication data that indicates that the user is authorized to operate the computer-assisted surgical system, the user control system to switch from operating in the third operating mode to operating in the second operating mode, wherein:
the first operating mode is an active mode, the second operating mode is a suspended mode, and the third operating mode is an inactive mode, and
while operating in the second operating mode the user control system is configured to suspend control of operations performed by the computer-assisted surgical system based on input provided by the user by way of the user control system.

* * * * *